US008736723B2

(12) United States Patent
Tsuruoka

(10) Patent No.: US 8,736,723 B2
(45) Date of Patent: May 27, 2014

(54) IMAGE PROCESSING SYSTEM, METHOD AND PROGRAM, INCLUDING A CORRECTION COEFFICIENT CALCULATION SECTION FOR GRADATION CORRECTION

(75) Inventor: Takao Tsuruoka, Machida (JP)

(73) Assignee: Olympus Corporation (JP)

( * ) Notice: Subject to any disclaimer, the term of this patent is extended or adjusted under 35 U.S.C. 154(b) by 856 days.

(21) Appl. No.: 12/120,392

(22) Filed: May 14, 2008

(65) Prior Publication Data

US 2008/0218635 A1 Sep. 11, 2008

Related U.S. Application Data

(63) Continuation of application No. PCT/JP2006/322472, filed on Nov. 10, 2006.

(30) Foreign Application Priority Data

Nov. 16, 2005 (JP) ................................. 2005-332010

(51) Int. Cl.
*H04N 5/202* (2006.01)
*G06K 9/40* (2006.01)
*H04N 5/228* (2006.01)

(52) U.S. Cl.
USPC .......................................... 348/254; 382/260

(58) Field of Classification Search
USPC .................... 348/242–243, 251–256
See application file for complete search history.

(56) References Cited

U.S. PATENT DOCUMENTS

| 5,905,579 | A | * | 5/1999 | Katayama et al. | 358/296 |
| 6,028,646 | A | * | 2/2000 | Jeong et al. | 348/645 |
| 6,754,398 | B1 | | 6/2004 | Yamada | |
| 7,423,781 | B2 | * | 9/2008 | Morimoto et al. | 358/2.1 |
| 2004/0027469 | A1 | | 2/2004 | Tsuruoka | |
| 2004/0218075 | A1 | | 11/2004 | Tsuruoka | |
| 2004/0252907 | A1 | | 12/2004 | Ito | |
| 2005/0157189 | A1 | | 7/2005 | Sambongi | |

FOREIGN PATENT DOCUMENTS

| EP | 1 059 811 | 12/2000 |
| EP | 1 677 516 | 7/2006 |
| JP | 05-244508 | 9/1993 |
| JP | 2001-118062 | 4/2001 |
| JP | 2001-167264 | 6/2001 |

(Continued)

OTHER PUBLICATIONS

International Search Report dated Feb. 13, 2007 issued in corresponding PCT Application No. PCT/JP2006/322472.

*Primary Examiner* — Twyler Haskins
*Assistant Examiner* — Carramah J Quiett
(74) *Attorney, Agent, or Firm* — Ostrolenk Faber LLP

(57) ABSTRACT

An image processing system includes a multiresolution decomposition section for frequency decomposing an image signal into high and low frequency components at an nth stage, a correction coefficient calculation section for calculating at least one of a gradation correction coefficient, a noise correction coefficient, and an edge correction coefficient with respect to the high frequency component at an ith decomposition stage ($1 \leq i \leq n$) based on at least one of the low frequency component at the ith decomposition stage, a visual system adaptation model, a noise amount estimation model, and an edge enhancement model, a correction section for correcting the high frequency component based on the calculated correction coefficient, and a multiresolution composition section for composing the image signal corrected based on the low frequency component and the corrected high frequency component.

36 Claims, 16 Drawing Sheets

(56) References Cited

FOREIGN PATENT DOCUMENTS

| | | |
|---|---|---|
| JP | 3 402 630 | 5/2003 |
| JP | 2003-134352 | 5/2003 |
| JP | 3 465 226 | 11/2003 |
| JP | 2004-072422 | 3/2004 |
| JP | 2004-128985 | 4/2004 |
| JP | 2004-287794 | 10/2004 |
| JP | 2004-312467 | 11/2004 |
| JP | 2005-130297 | 5/2005 |
| JP | 2005-311962 | 11/2005 |
| WO | WO 03/036939 | 5/2003 |
| WO | WO 2004/091223 | 10/2004 |
| WO | WO 2005/041560 | 5/2005 |

* cited by examiner

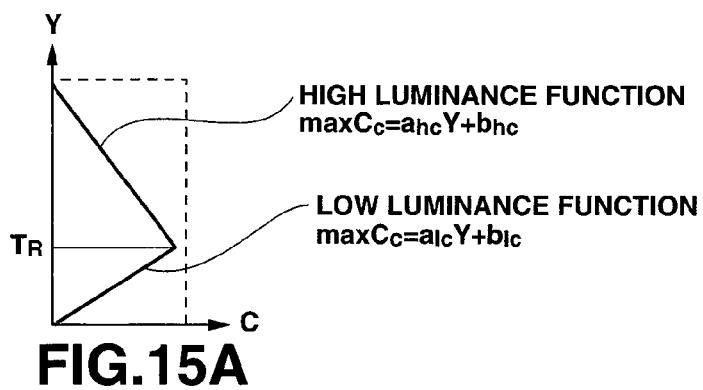
FIG.15A
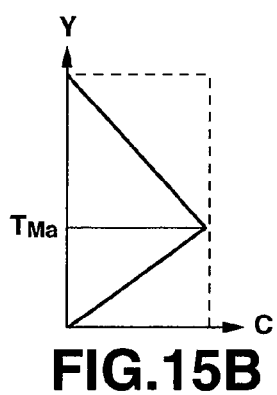
FIG.15B
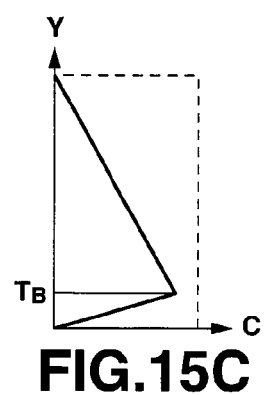
FIG.15C
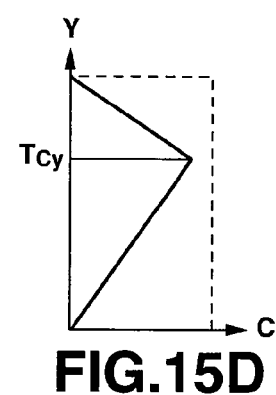
FIG.15D
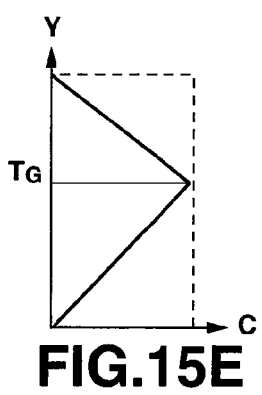
FIG.15E
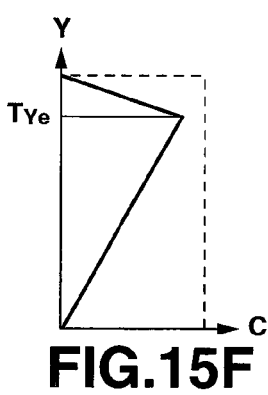
FIG.15F
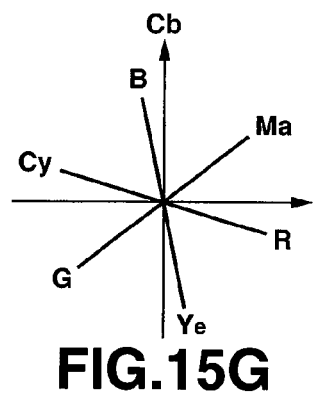
FIG.15G
FIG.16
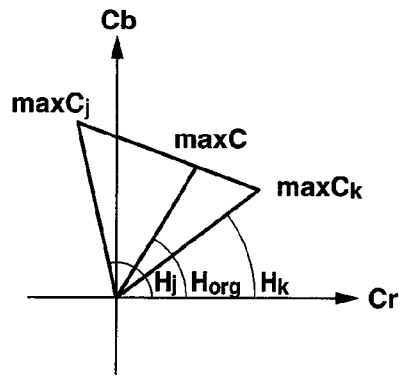

IMAGE PROCESSING SYSTEM, METHOD AND PROGRAM, INCLUDING A CORRECTION COEFFICIENT CALCULATION SECTION FOR GRADATION CORRECTION

CROSS REFERENCE TO RELATED APPLICATION

This application is a continuation application of PCT/JP2006/322472 filed on Nov. 10, 2006 and claims benefit of Japanese Application No. 2005-332010 filed in Japan on Nov. 16, 2005, the entire contents of which are incorporated herein by this reference.

BACKGROUND OF THE INVENTION

1. Field of the Invention

The present invention relates to an image processing system, an image processing method, and a computer program product for performing a predetermined image processing with respect to an image signal.

2. Description of the Related Art

A space variant process for the image processing has been employed to perform the different image processing for each local region.

U.S. Pat. No. 3,465,226 discloses the technology where an image signal is divided into a plurality of regions based on the texture information to obtain the gradation conversion curve based on the histogram for each region such that the weighting interpolation is executed based on the distance between the respective regions. This makes it possible to enable both the space variant gradation process and the maintenance of the continuity between the regions to obtain the high-definition image signal while preventing the crash in the tone with respect to the image in the wide dynamic range.

For example, U.S. Pat. No. 3,402,630 discloses the technology for performing the contrast enhancement by correcting the high frequency component based on the low frequency component derived from the multiresolution decomposition and the odd variable function. This makes it possible to allow the processing which combines the space variant contrast enhancement with maintenance of the continuity between the regions so as to provide the high-definition image signal for improving the diagnostic performance with respect to the medical image.

Japanese Unexamined Patent Application Publication No. 2004-72422 discloses the technology for performing the noise reducing processing which is different for each pixel by estimating the noise amount for each pixel based on the noise model. This makes it possible to perform the space variant noise reducing process, thus providing the high-definition image signal while minimizing the degradation of the edge component.

In U.S. Pat. No. 3,465,226, the weighting interpolation is inevitable for each pixel for the purpose of maintaining the continuity between the regions, which may demand more calculation work and longer processing time. When the disclosed technology expected to be used for the luminance signal is applied to the color image signal, such problem as having the color signal departing from the color reproduction region may occur.

In U.S. Pat. No. 3,402,630, the high frequency component is corrected based on the odd variable function. However, as the process for automatically setting the odd variable function is not specified, it should be defined in the subjective assessment manner. Though the technology may be applicable to the medical image under the limited shooting condition, the appropriate contrast enhancement cannot be performed automatically with respect to the various types of subject.

In Japanese Unexamined Patent Application Publication No. 2004-72422, the noise reducing process is performed separately from the other gradation correction process and the edge enhancement process, which may fail to appropriately perform the respective processes in a mutually appropriate manner.

It is an object of the present invention to provide an image processing system, an image processing method, and a computer program product which enable the high speed correction process with respect to the image signal while allowing both the space variant process and maintenance of the continuity among the local regions.

SUMMARY OF THE INVENTION

In order to achieve the above-mentioned object, the present invention provides an image processing system which performs a predetermined image processing with respect to an image signal, which includes multiresolution decomposition means for decomposing the image signal to a high frequency component and a low frequency component at an nth stage (n: integer equal to or larger than 1), correction coefficient calculation means for calculating a correction coefficient with respect to the high frequency component, correction means for correcting the high frequency component based on the correction coefficient, and multiresolution composition means for composing a corrected image signal based on the corrected high frequency component and the low frequency component. The correction coefficient calculation means in the system includes gradation correction coefficient calculation means for calculating a gradation correction coefficient with respect to the high frequency component at an ith decomposition stage (i: integer equal to or larger than 1, and equal to or smaller than n) based on the low frequency component at the ith decomposition stage, and a visual system adaptation model.

The present invention further provides an image processing system which performs a predetermined image processing with respect to an image signal, which includes multiresolution decomposition means for decomposing the image signal to a high frequency component and a low frequency component at an nth stage, correction coefficient calculation means for calculating a correction coefficient with respect to the high frequency component, correction means for correcting the high frequency component based on the correction coefficient, and multiresolution composition means for composing a corrected image signal based on the corrected high frequency component and the low frequency component. The correction coefficient calculation means in the system includes edge correction coefficient calculation means for calculating an edge correction coefficient with respect to the high frequency component at the ith decomposition stage based on a number i of the decomposition stage and an edge enhancement model.

The present invention further provides an image processing system which performs a predetermined image processing with respect to an image signal, which includes a multiresolution decomposition section for decomposing the image signal to a high frequency component and a low frequency component at an nth stage, a correction coefficient calculation section for calculating a correction coefficient with respect to the high frequency component, a correction section for correcting the high frequency component based on the correction coefficient, and a multiresolution composition section for composing a corrected image signal based on the corrected high frequency component and the low frequency component. The correction coefficient calculation section in the system includes gradation correction coefficient calculation section for calculating a gradation correction coefficient with respect to the high frequency component at an ith decomposition stage based on the low frequency component at the ith decomposition stage, and a visual system adaptation model.

The present invention further provides an image processing method which allows a computer to execute a predetermined image processing to an image signal. The method includes a multiresolution decomposition step for decomposing the image signal to a high frequency component and a low frequency component at an nth stage, a correction coefficient calculation step for calculating a correction coefficient with respect to the high frequency component, a correction step for correcting the high frequency component based on the correction coefficient, and a multiresolution composition step for composing a corrected image signal based on the corrected high frequency component and the low frequency component. The correction coefficient calculation step of the method includes a gradation correction coefficient calculation step for calculating a gradation correction coefficient with respect to the high frequency component at an ith decomposition stage based on the low frequency component at the ith decomposition stage and a visual system adaptation model.

The present invention further provides a computer program product which allows a computer to execute a predetermined image processing to an image signal. The program includes a multiresolution decomposition module for decomposing the image signal to a high frequency component and a low frequency component at an nth stage, a correction coefficient calculation module for calculating a correction coefficient with respect to the high frequency component, a correction module for correcting the high frequency component based on the correction coefficient, and a multiresolution composition module for composing a corrected image signal based on the corrected high frequency component and the low frequency component. The correction coefficient calculation module of the product includes a gradation correction coefficient calculation module for calculating a gradation correction coefficient with respect to the high frequency component at an ith decomposition stage based on the low frequency component at the ith decomposition stage, and a visual system adaptation model.

BRIEF DESCRIPTION OF THE DRAWINGS

FIGS. 15A to 15G each show a line graph for explaining a maximum saturation value on each hue plane in YCbCr color space according to Embodiment 2.

FIG. 16 is a line graph for explaining calculation for interpolation of the maximum saturation on an intermediate hue plane.

DETAILED DESCRIPTION OF THE PREFERRED EMBODIMENT(S)

Figure 1:
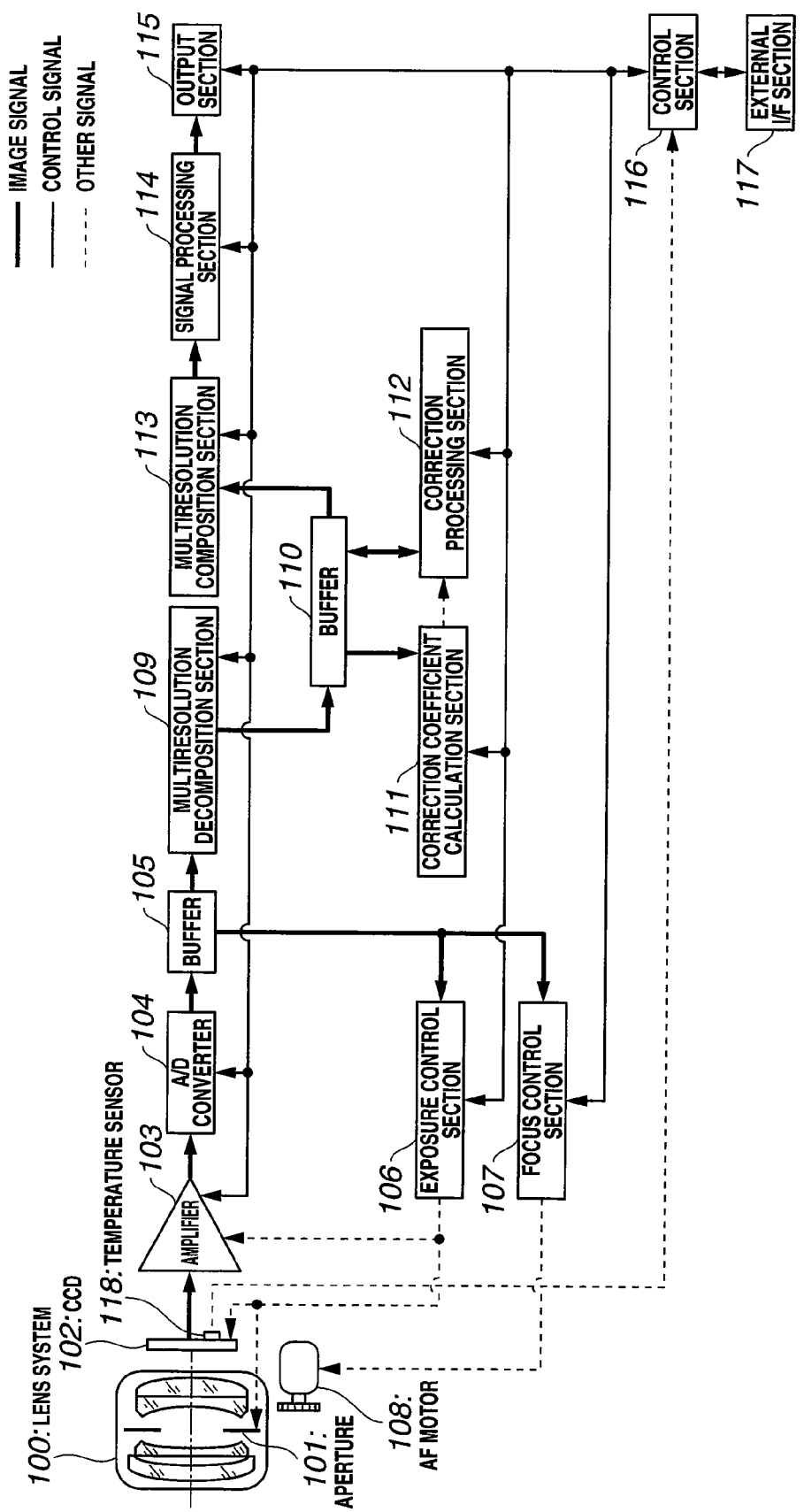
FIG. 1 is a block diagram showing a structure of an image processing system according to Embodiment 1 of the present invention.

Embodiments according to the present invention will be described referring to the drawings.

Embodiment 1

Figure 2:
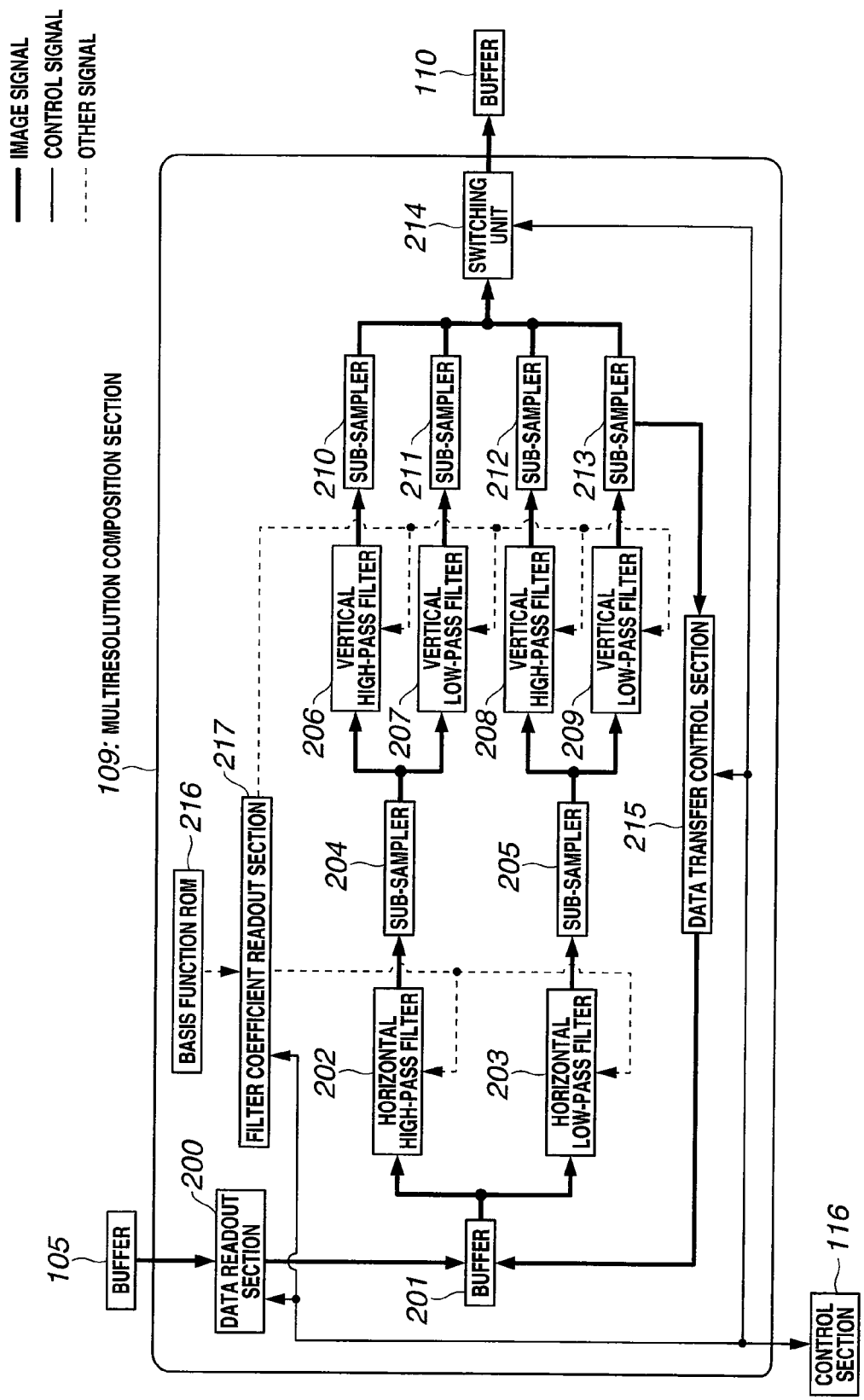
FIG. 2 is a block diagram showing a structure of a multiresolution decomposition section according to Embodiment 1.
Figure 3:
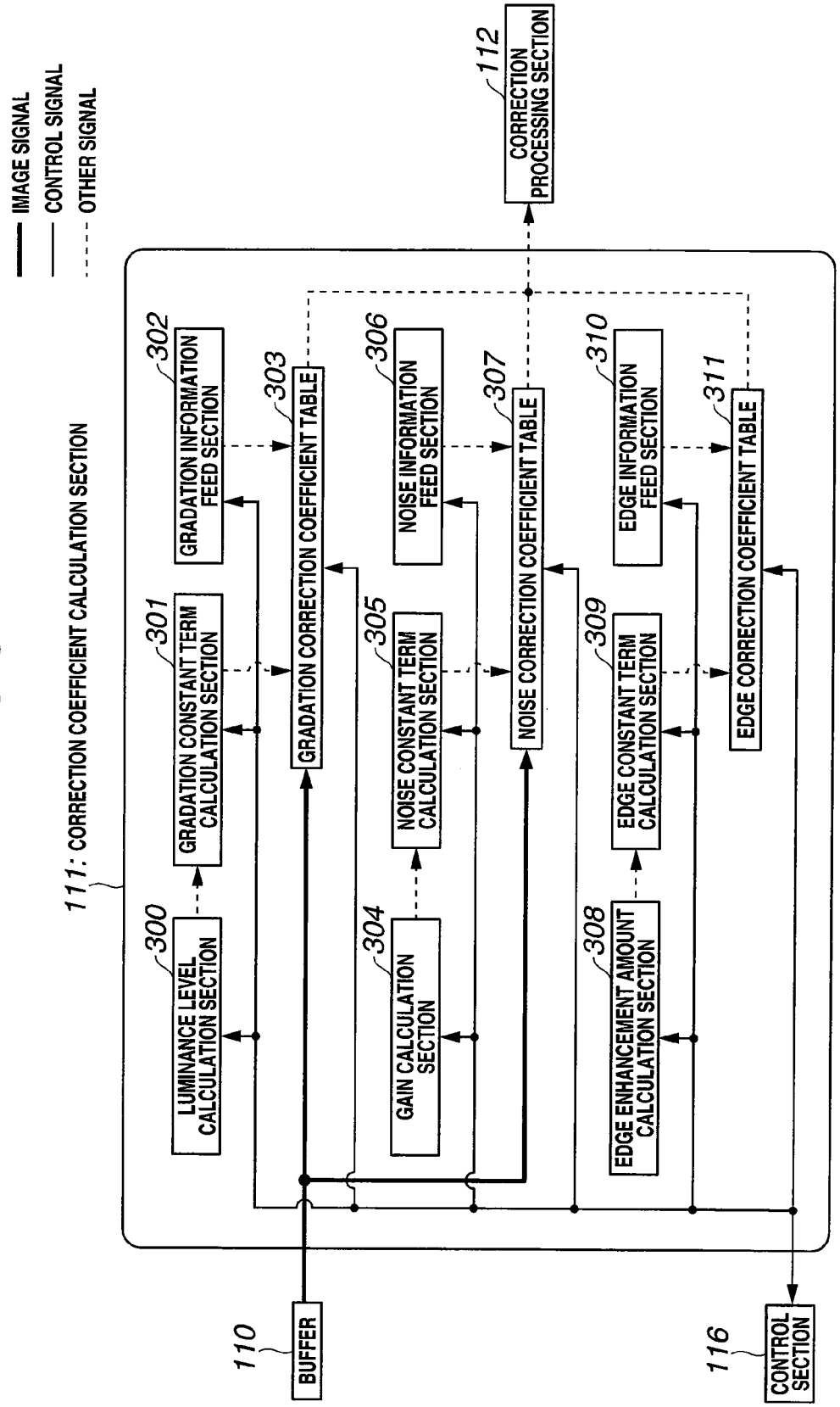
FIG. 3 is a block diagram showing a structure of a correction coefficient calculation section according to Embodiment 1.
Figure 4:
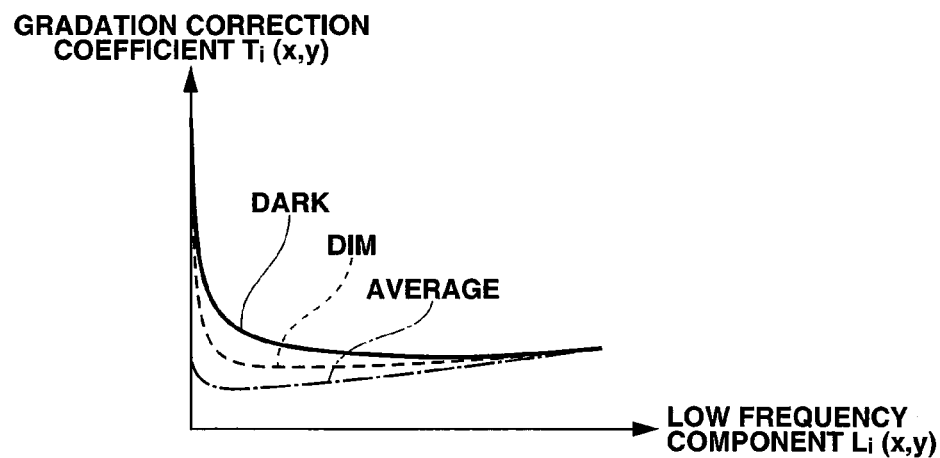
FIG. 4 is a line graph showing a visual adaptation model with respect to a gradation correction coefficient table used in the correction coefficient calculation section according to Embodiment 1.
Figure 5:
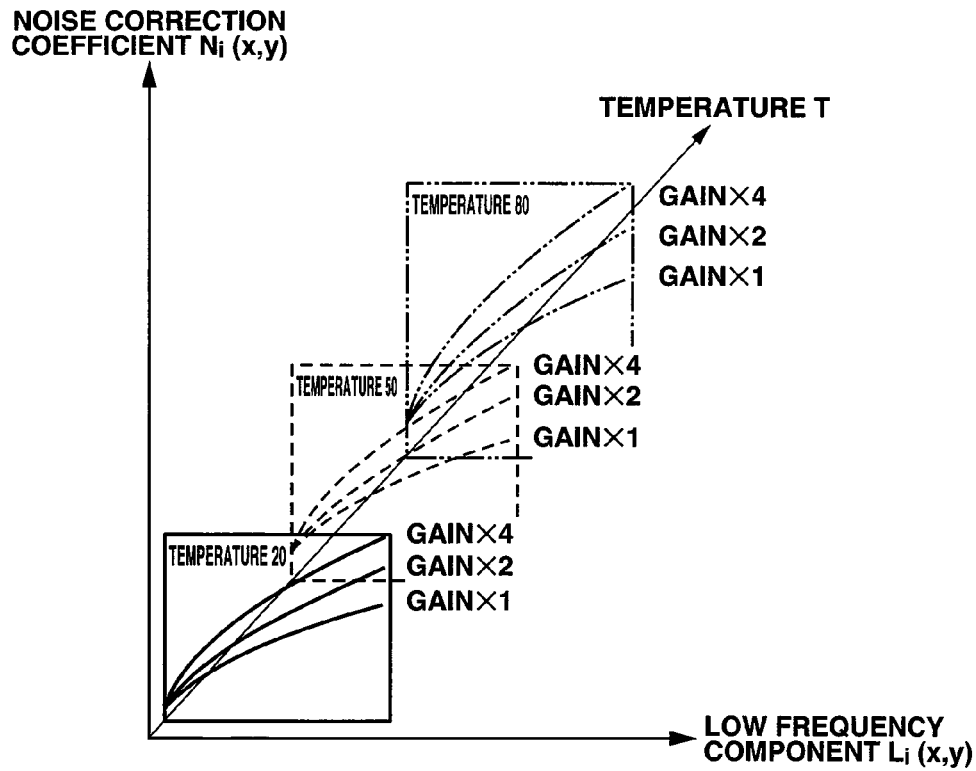
FIG. 5 is a diagram showing an estimation model of a noise amount with respect to the noise correction coefficient table used in the correction coefficient calculation section according to Embodiment 1.
Figure 6:
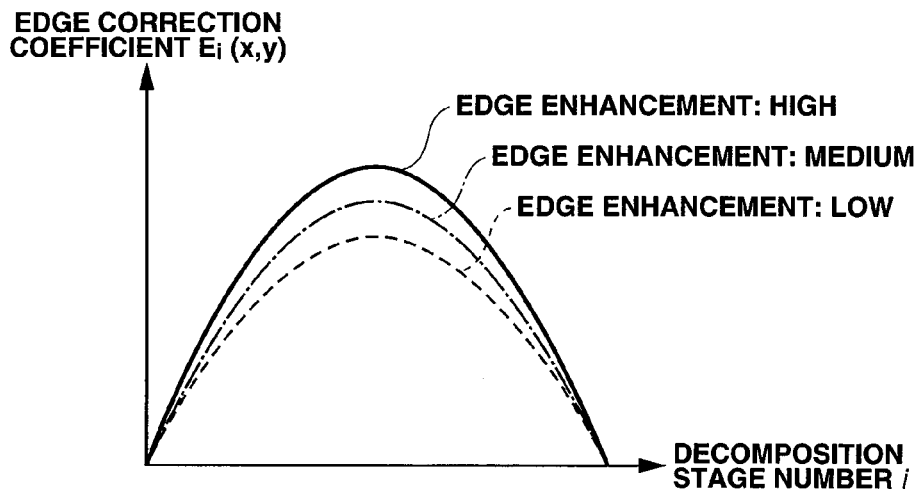
FIG. 6 is a line graph showing an edge enhancement model with respect to the edge correction coefficient table used in the correction coefficient calculation section according to Embodiment 1.
Figure 7:
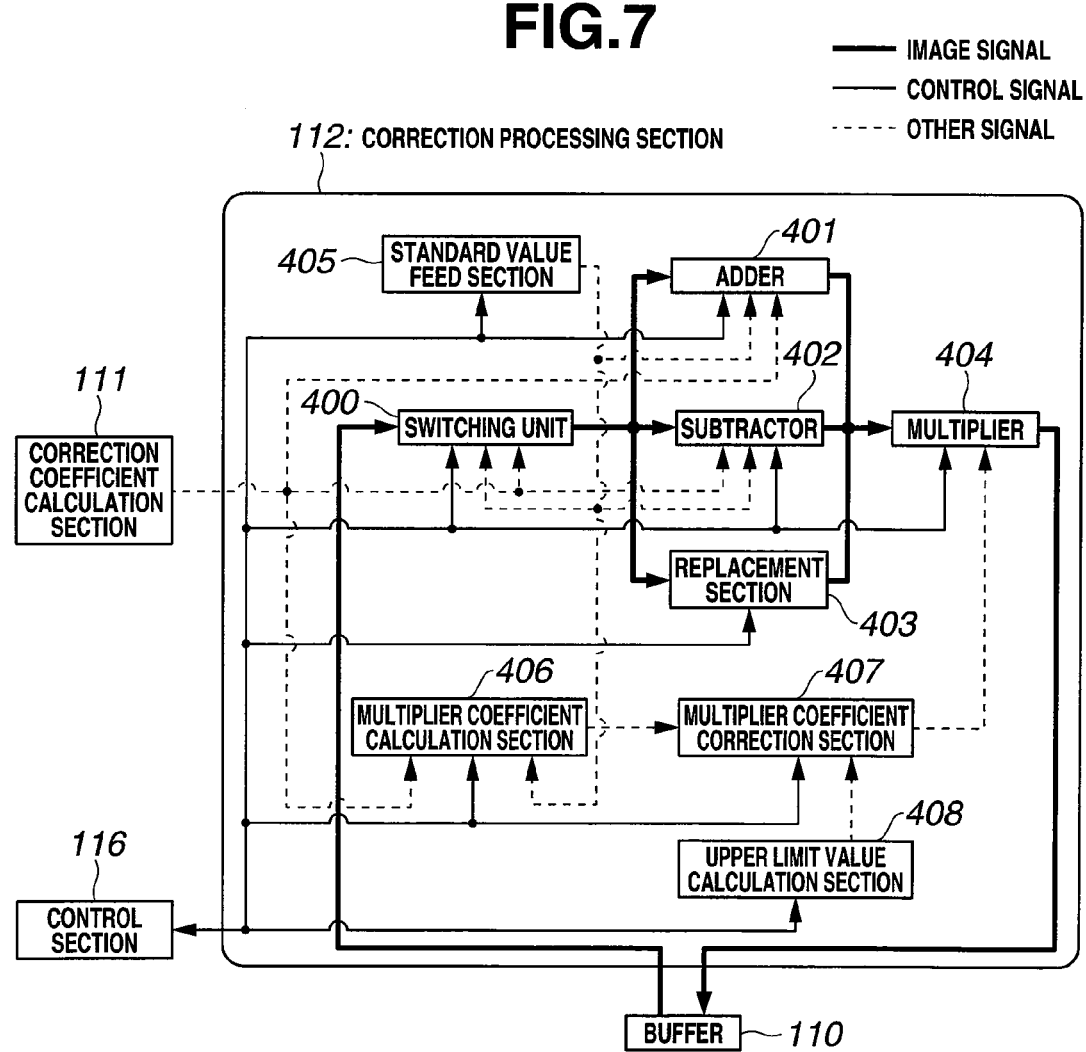
FIG. 7 is a block diagram showing a structure of a correction processing section according to Embodiment 1.
Figure 8:
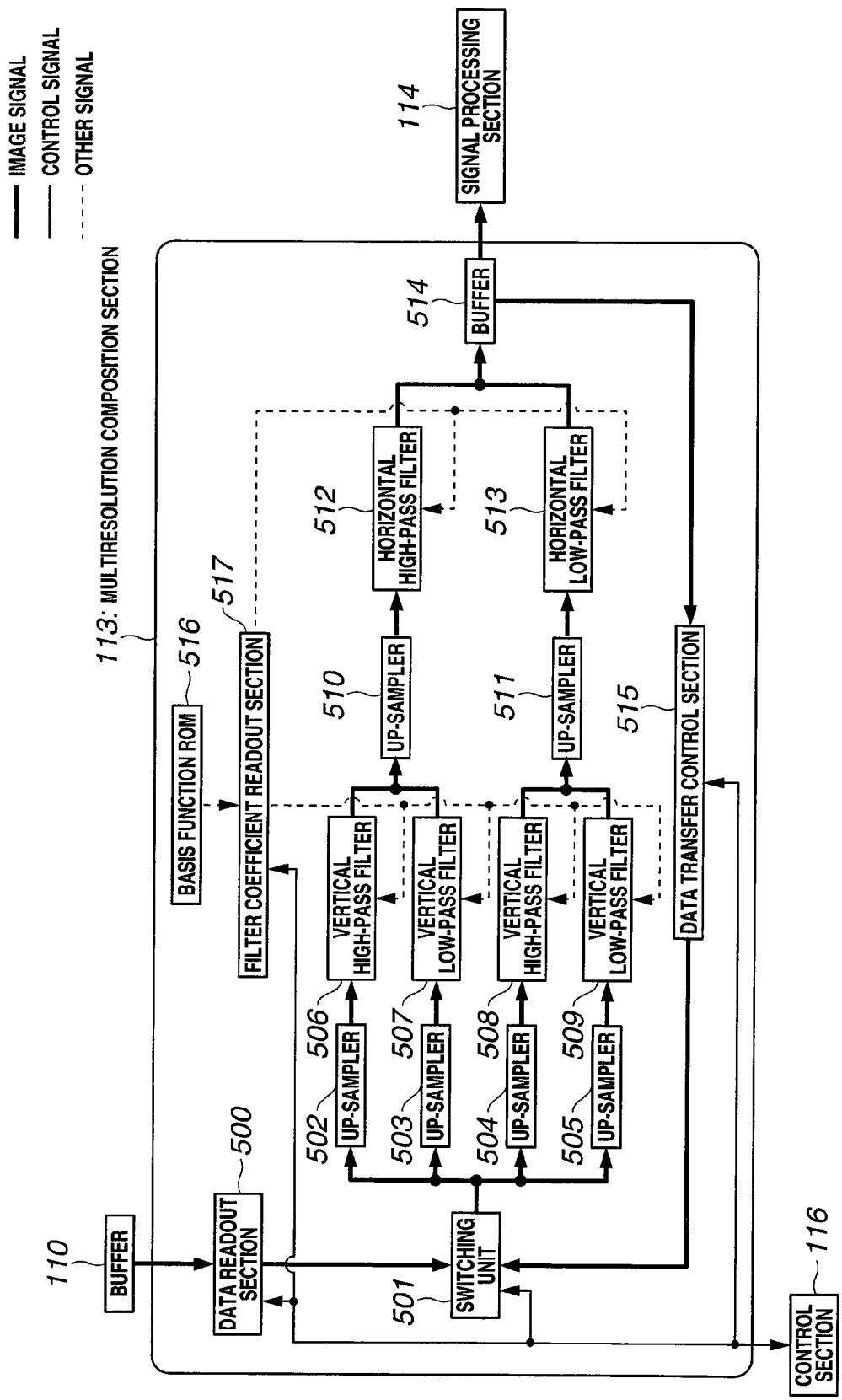
FIG. 8 is a block diagram showing a structure of a multiresolution composite section according to Embodiment 1.
Figure 9:
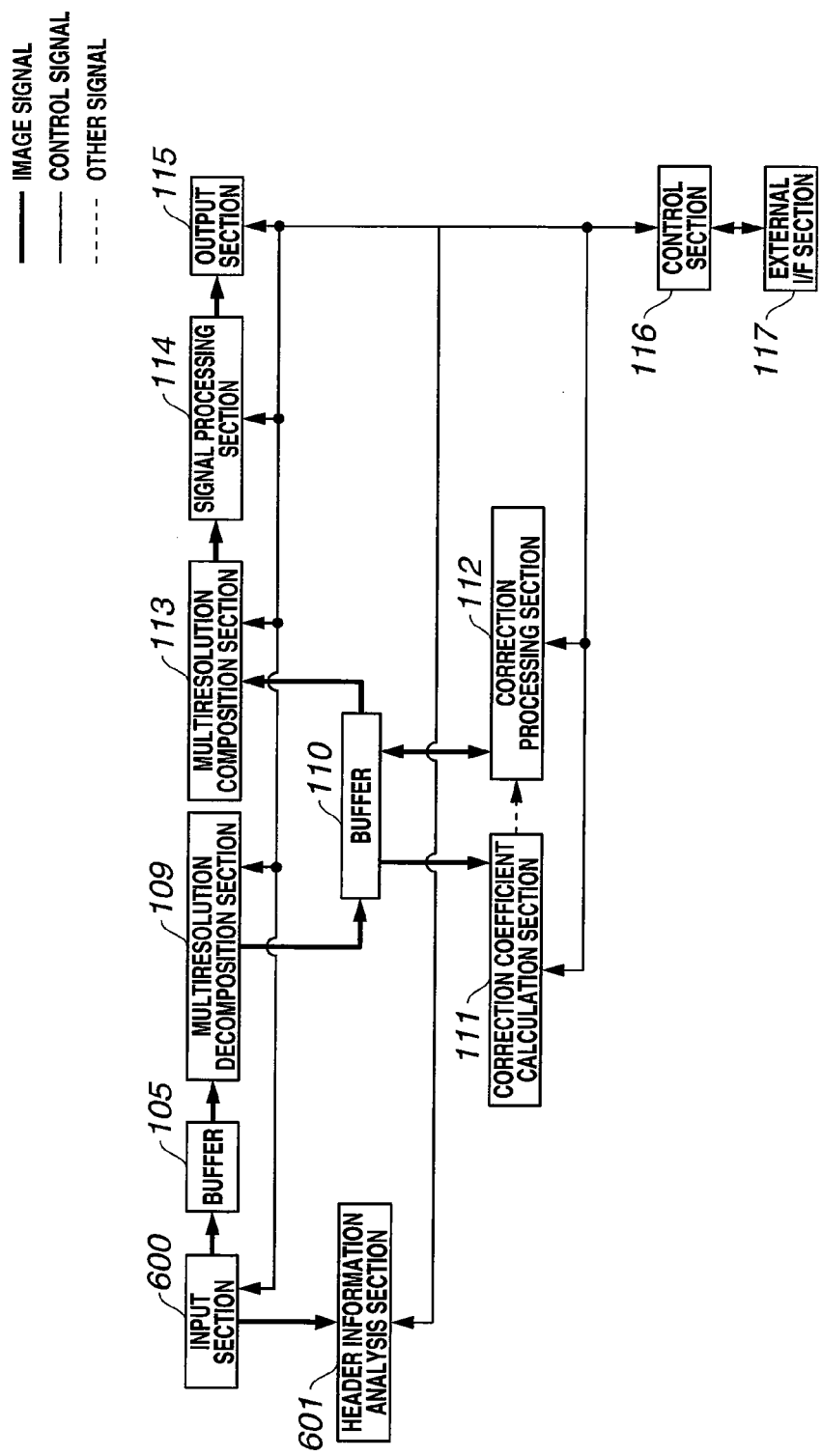
FIG. 9 is a block diagram showing another structure of the image processing system according to Embodiment 1.
Figure 10:
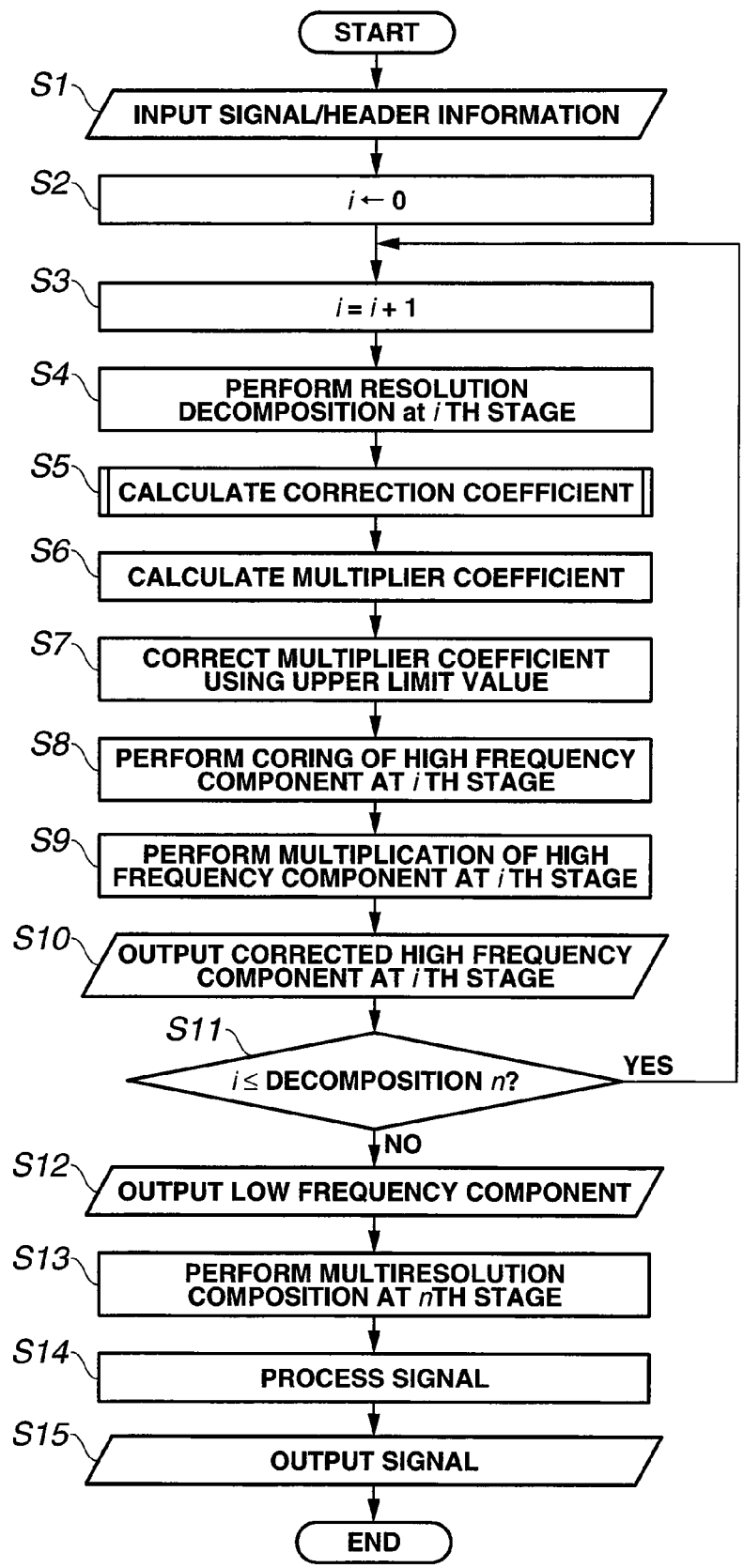
FIG. 10 is a flow chart showing an entire signal processing routine based on an image processing program according to Embodiment 1.
Figure 11:
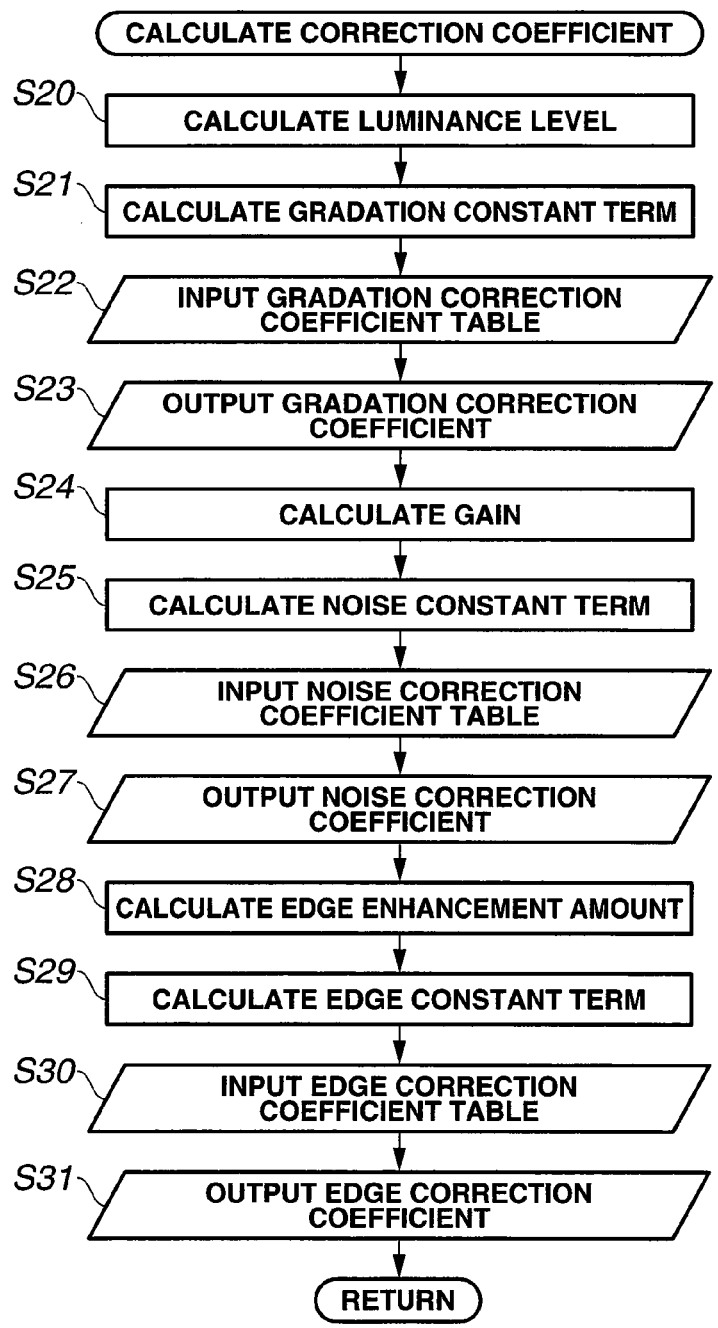
FIG. 11 is a flow chart showing a detail of correction coefficient calculation process executed in step S5 shown in FIG. 10.

FIGS. 1 to 11 show Embodiment 1 according to the present invention. FIG. 1 is a block diagram showing a structure of an image processing system. FIG. 2 is a block diagram showing a structure of a multiresolution decomposition section. FIG. 3 is a block diagram showing a structure of a correction coefficient calculation section. FIG. 4 is a line graph showing a visual system adaptation model with respect to a gradation correction coefficient table used in the correction coefficient calculation section. FIG. 5 is a diagram showing an estimation model of a noise amount with respect to the noise correction coefficient table used in the correction coefficient calculation section. FIG. 6 is a line graph showing an edge enhancement model with respect to the edge correction coefficient table used in the correction coefficient calculation section. FIG. 7 is a block diagram showing the structure of the correction processing section. FIG. 8 is a block diagram showing the structure of a multiresolution composite section. FIG. 9 is a block diagram showing another structure of the image processing system. FIG. 10 is a flow chart showing an entire signal processing routine based on an image processing program. FIG. 11 is a flow chart showing a detail of correction coefficient calculation process executed in step S5 shown in FIG. 10.

First, referring to FIG. 1, a structure of the image processing system will be described. The image processing system shown in FIG. 1 represents a digital camera to which the image processing system according to the present invention is applied.

The image processing system includes a lens system 100, an aperture 101, a CCD 102, an amplifier 103, an A/D converter 104, a buffer 105, an exposure control section 106, a focus control section 107, an AF motor 108, a multiresolution decomposition section 109, a buffer 110, a correction coefficient calculation section 111, a correction processing section 112, a multiresolution composition section 113, a signal processing section 114, an output section 115, a control section 116, and an external I/F section 117, a temperature sensor 118.

The lens system 100 functions for forming an optical image of a subject into an image on an image pickup surface of the CCD 102.

The aperture 101 functions for defining a range where the luminance flux of the subject to be formed into the image by the lens system 100 passes to change the brightness of the optical image formed on the image pickup surface of the CCD 102.

The CCD 102 is an image pickup device for outputting a photoelectric converted optical image to be formed into the image as the analog image signal. In the embodiment, a single CCD for monochrome is employed as the CCD 102. As the image pickup device, not only the CCD but also CMOS and the other image pickup devices may be employed.

The temperature sensor 118 substantively measures the temperature of the CCD 102 so as to be outputted to the control section 116.

The amplifier 103 amplifies the image signal outputted from the CCD 102. The amount of amplification performed by the amplifier 103 is set by the exposure control section 106 under the control of the control section 116.

The A/D converter 104 converts the analog image signal outputted from the CCD 102 and amplified by the amplifier 103 into a digital image signal under the control of the control section 116.

The buffer 105 temporarily records the digital image signal outputted from the A/D converter 104.

The exposure control section 106 obtains the luminance level of the image signal stored in the buffer 105 in the pre-shooting mode to control the aperture value of the aperture 101, the electronic shutter speed of the CCD 102 and the amplification factor of the amplifier 103 for the appropriate exposure in consideration with the set ISO sensitivity and the shutter speed at the limit of image stability under the control of the control section 116.

The focus control section 107 detects an edge strength of the image signal stored in the buffer 105 in the pre-shooting mode, and controls the AF motor 108 to maximize the edge strength for obtaining the focused image under the control of the control section 116.

The AF motor 108 serves as the drive source for driving an AF lens of the lens system 100 under the control of the focus control section 107.

The multiresolution decomposition section 109 as multiresolution decomposition means reads the image signal stored in the buffer 105 to perform the multiresolution decomposition at a predetermined nth (n: integer equal to or greater than 1) stage under the control of the control section 116.

The buffer 110 stores the high frequency component and the low frequency component derived from the multiresolution decomposition section 109.

The correction coefficient calculation section 111 reads the low frequency component at the ith (i: integer equal to or greater than 1 and equal to or less than n) decomposition stage from the buffer 110 to calculate a gradation correction coefficient, a noise correction coefficient and an edge correction coefficient using reference information from the control section 116 to be described later as the correction coefficient calculation means under the control of the control section 116.

The correction processing section 112 as correction means reads the high frequency component at the ith decomposition stage from the buffer 110 to correct the thus read high frequency component using the gradation correction coefficient, the noise correction coefficient, and the edge correction coefficient from the correction coefficient calculation section 111 under the control of the control section 116. The high frequency component corrected by the correction processing section 112 is transferred to the buffer 110 so as to overwrite the high frequency component value before the correction.

Upon completion of the correction with respect to the high frequency components at all the decomposition stages, the multiresolution composition section 113 as the multiresolution composition means reads the low frequency components and the corrected high frequency components from the buffer 110 to perform the composition of the corrected image signal under the control of the control section 116.

The signal processing section 114 performs the known compression processing and the like with respect to the corrected image signal outputted from the multiresolution composition section 113 so as to transfer the processed signal to the output section 115 under the control of the control section 116.

The output section 115 records the image signal outputted from the signal processing section 114 in a recording medium such as a memory card so as to be stored therein.

The control section 116 formed as a microcomputer, for example, is connected to the amplifier 103, the A/D converter 104, the exposure control section 106, the focus control section 107, the multiresolution decomposition section 109, the correction coefficient calculation section 111, the correction processing section 112, the multiresolution composition section 113, the signal processing section 114, the output section 115, and the external I/F section 117 bi-directionally, which serves as control means for controlling the entire digital camera which includes the aforementioned components. The control section 116 serves as gradation correction coefficient calculation means, gradation information acquiring means, luminance level calculation means, noise correction coefficient calculation means, noise information acquiring means, gain calculation means, edge correction coefficient calculation means, edge information acquiring means, and edge enhancement amount calculation means. The control section 116 is structured to receive an input of the signal from the temperature sensor 118 disposed in the vicinity of the CCD 102.

The external I/F section 117 is an interface through which the input is performed by the user to the digital camera to which the image processing system is applied, and includes a power switch for turning the power ON/OFF, the shutter button for starting the shooting operation, and the mode selector button for switching the operation mode to the shooting mode and other modes. The user is allowed to input for starting the pre-shooting by operating the first stage of the two-stage shutter button, and for starting the real shooting by operating the second stage of the shutter button. The user is allowed to set the shooting condition, for example, ISO sensitivity, and the image processing condition such as the edge enhancement and the saturation enhancement via the external I/F section 117. Upon reception of the aforementioned information, the external I/F section 117 outputs the inputted information to the control section 116.

Next, the operation of the digital camera as shown in FIG. 1 will be described referring to the flow of the image signal.

The user is expected to preliminarily set the shooting condition such as the ISO sensitivity and the image processing conditions such as the edge enhancement and the saturation enhancement through the external I/F section 117 prior to the shooting.

Thereafter, when the user presses the shutter button as the two-stage switch of the external I/F section 117 halfway, the digital camera is brought into the pre-shooting mode.

The subject image formed through the lens system 100 and the aperture 101 is photoelectrically converted by the CCD 102 and outputted as the analog image signal.

The analog image signal is subjected to the amplification in consideration with the ISO sensitivity by the amplifier 103, and further converted into the digital image signal by the A/D converter 104 so as to be stored in the buffer 105.

The image signal recorded in the buffer 105 is transferred to the exposure control section 106 and the focus control section 107, respectively.

The exposure control section 106 controls the aperture value of the aperture 101, the electronic shutter speed of the CCD 102, and the amplification factor of the amplifier 103 to establish the appropriate exposure based on the image signal in consideration with the set ISO sensitivity and the shutter speed to the limit of the image stability.

The focus control section 107 detects the edge strength as described above and controls the AF motor 108 such that the edge strength is maximized to obtain a focused image based on the image signal.

When the user fully presses the shutter button as the two-stage switch of the external I/F section 117 subsequent to the focus adjustment and the exposure adjustment, the digital camera is brought into the real shooting mode.

Likewise the pre-shooting mode, the image signal is transferred to the buffer 105. The real shooting is performed based on the exposure condition obtained by the exposure control section 106 and the focus condition obtained by the focus control section 107. Those conditions at the time of shooting are transferred to the control section 116.

The image signal in the buffer 105 obtained by the real shooting is transferred to the multiresolution decomposition section 109.

The multiresolution decomposition section 109 reads the image signal stored in the buffer 105 to perform the multiresolution decomposition at a predetermined nth stage under the control of the control section 116 so as to generate the high frequency component and the low frequency component sequentially. The multiresolution decomposition section 109 further transfers the generated high frequency and low frequency components to the buffer 110 sequentially.

The correction coefficient calculation section 111 reads the low frequency component at the ith decomposition stage from the buffer 110 under the control of the control section 116. The control section 116 transfers the information with respect to the image processing, for example, the shutter speed, the aperture value, and the ISO sensitivity to the correction coefficient calculation section 111. The correction coefficient calculation section 111 calculates the gradation correction coefficient used for the gradation conversion based on the low frequency component, the related information and the visual system adaptation model, the noise correction coefficient used for the noise reducing processing based on the low frequency component, the related information and the noise amount estimation model, and the edge correction coefficient used for the edge enhancement processing based on the number i of the decomposition stage, the related information and the edge enhancement model, respectively. Thereafter, the correction coefficient calculation section 111 transfers the respective calculated correction coefficients to the correction processing section 112.

The correction processing section 112 reads the high frequency component at the ith decomposition stage from the buffer 110, and the gradation correction coefficient, the noise correction coefficient, and the edge correction coefficient from the correction coefficient calculation section 111, respectively under the control of the control section 116, and corrects the high frequency component using the thus read correction coefficients.

The high frequency component corrected by the correction processing section 112 is transferred to the buffer 110 to overwrite the high frequency component value before the correction.

Each processing performed by the correction coefficient calculation section 111 and the correction processing section 112 will be performed in synchronization with each other for each unit of the ith decomposition stage under the control of the control section 116.

Composition stages, the multiresolution composition section 113 reads the low frequency component and the thus corrected high frequency component from the buffer 110 to compose the corrected image signal under the control of the control section 116. The multiresolution composition section 113 transfers the corrected image signal to the signal processing section 114.

In Embodiment 1, the wavelet transformation (orthogonal wavelet transformation or biorthogonal wavelet transformation) is expected to be employed for performing the multiresolution decomposition process and the multiresolution composition process.

The signal processing section 114 performs the known compression process and the like to the corrected image signal outputted from the multiresolution composition section 113 under the control of the control section 116, and further transforms the thus processed signal to the output section 115.

The output section 115 records the image signal outputted from the signal processing section 114 in the recording medium such as a memory card so as to be stored therein.

Next, an exemplary structure of the multiresolution decomposition section 109 will be described referring to FIG. 2.

The multiresolution decomposition section 109 includes a data readout section 200, a buffer 201, a horizontal high-pass filter 202, a horizontal low-pass filter 203, a sub-sampler 204, a sub-sampler 205, a vertical high-pass filter 206, a vertical low-pass filter 207, a vertical high-pass filter 208, a vertical low-pass filter 209, a sub-sampler 210, a sub-sampler 211, a sub-sampler 212, a sub-sampler 213, a switching unit 214, a data transfer control section 215, a basis function ROM 216, and a filter coefficient readout section 217.

The buffer 105 is connected to the buffer 201 via the data readout section 200. The buffer 201 is connected to the horizontal high-pass filter 202 and the horizontal low-pass filter 203. The horizontal high-pass filter 202 is connected to the vertical high-pass filter 206 and the vertical low-pass filter 207 via the sub-sampler 204. The horizontal low-pass filter 203 is connected to the vertical high-pass filter 208 and the vertical low-pass filter 209 via the sub-sampler 205. The vertical high-pass filter 206 is connected to the sub-sampler 210, the vertical low-pass filter 207 is connected to the sub-sampler 211, the vertical high-pass filter 208 is connected to the sub-sampler 212, and the vertical low-pass filter 209 is connected to the sub-sampler 213, respectively. The sub-samplers 210, 211, 212 and 213 are connected to the switching unit 214, respectively. The sub-sampler 213 is further connected to the data transfer control section 215. The switching unit 214 is connected to the buffer 110. The data transfer control section 215 is connected to the buffer 201. The basis function ROM 216 is connected to the filter coefficient readout section 217. The filter coefficient readout section 217 is connected to the horizontal high-pass filter 202, the horizontal low-pass filter 203, the vertical high-pass filter 206, the vertical low-pass filter 207, the vertical high-pass filter 208, and the vertical low-pass filter 209, respectively.

The control section 116 is connected to the data readout section 200, the switching unit 214, the data transfer control section 215, and the filter coefficient readout section 217 bi-directionally so as to be controlled.

The basis function ROM 216 records the filter coefficients used for the wavelet transformation such as Harr function and Daubechies function. The coefficients of the high-pass filter and the low-pass filter for Harr function among those for the wavelet transformation will be shown as below.

High-pass filter coefficient={0.5,−0.5}     [Equation 1]

Low-pass filter coefficient={0.5,0.5}     [Equation 2]

where those filter coefficients may be used both in the horizontal and vertical directions.

The filter coefficient readout section 217 reads the filter coefficient from the basis function ROM 216 under the control of the control section 116 to transfer the high-pass filter coefficient to the horizontal high-pass filter 202, the vertical high-pass filter 206, the vertical high-pass filter 208, and the low-pass filter coefficient to the horizontal low-pass filter 203, the vertical low-pass filter 207, and the vertical low-pass filter 209, respectively.

Subsequent to the transfer of the filter coefficients to the respective high-pass and low-pass filters, the data readout section 200 reads the image signal from the buffer 105 so as to be transferred to the buffer 201 under the control of the control section 116. Hereinafter, the image signal which has been read from the buffer 105 and stored in the buffer 201 will be referred to as $L_0$.

The image signal on the buffer 201 is subjected to filtering processings in the horizontal and vertical directions by the horizontal high-pass filter 202, the horizontal low-pass filter 203, the vertical high-pass filter 206, the vertical low-pass filter 207, the vertical high-pass filter 208, and the vertical low-pass filter 209, respectively.

Therefore, the sub-samplers 204 and 205 sub-sample the inputted image signal to ½ in the horizontal direction. The sub-samplers 210, 211, 212 and 213 sub-sample the inputted image signal to ½ in the vertical direction.

The sub-sampler 210 outputs the high frequency component $Hhv_1$ in both the horizontal and vertical directions. The sub-sampler 211 outputs the horizontal high frequency component $Hh_1$. The sub-sampler 212 outputs the vertical high frequency component $Hv_1$. The sub-sampler 213 outputs the low frequency component $L_1$, respectively.

The switching unit 214 transfers the aforementioned three high frequency components $Hhv_1$, $Hh_1$, and $Hv_1$, and the low frequency component $L_1$ to the buffer 110 sequentially under the control of the control section 116.

The data transfer control section 215 transfers the low frequency component $L_1$ from the sub-sampler 213 to the buffer 201 under the control of the control section 116.

Thus, the low frequency component $L_1$ stored in the buffer 201 is subjected to the decomposition at the second stage through the filtering process as described above such that the three high frequency components $Hhv_2$, $Hh_2$, and $Hv_2$, and the low frequency component $L_2$ are outputted.

The aforementioned process is controlled to be repeatedly performed until the predetermined nth decomposition is performed by the control section 116. Upon completion of the nth decomposition, the buffer 110 stores the high frequency components $Hhv_1$, $Hh_1$ and $Hv_1$, and the low frequency component $L_1$ (i=1 to n).

Subsequently, referring to FIG. 3, an exemplary structure of the correction coefficient calculation section 111 will be explained.

The correction coefficient calculation section 111 includes a luminance level calculation section 300, a gradation constant term calculation section 301, a gradation information feed section 302, a gradation correction coefficient table 303, a gain calculation section 304, a noise constant term calculation section 305, a noise information feed section 306, a noise correction coefficient table 307, an edge enhancement amount calculation section 308, an edge constant term calculation section 309, an edge information feed section 310, and an edge correction coefficient table 311.

The buffer 110 is connected to the gradation correction coefficient table 303, and the noise correction coefficient table 307, respectively. The gradation correction coefficient table 303, the noise correction coefficient table 307 and the edge correction coefficient table 311 are connected to the correction processing section 112, respectively. The luminance level calculation section 300 is connected to the gradation constant term calculation section 301. The gradation constant term calculation section 301 and the gradation information feed section 302 are connected to the gradation correction coefficient table 303, respectively. The gain calculation section 304 is connected to the noise constant term calculation section 305. The noise constant term calculation section 305 and the noise information feed section 306 are connected to the noise correction coefficient table 307, respectively. The edge enhancement amount calculation section 308 is connected to the edge constant term calculation section 309. The edge constant term calculation section 309 and the edge information feed section 310 are connected to the edge correction coefficient table 311, respectively.

The luminance level calculation section 300 serves as gradation correction coefficient calculation means, gradation information acquiring means and luminance level calculation means. The gradation constant term calculation section 301 serves as gradation correction coefficient calculation means, gradation information acquiring means and gradation constant term calculation means. The gradation information feed means 302 serves as gradation correction coefficient calculation means and gradation information feed means. The gradation correction coefficient table 303 serves as gradation correction coefficient calculation means and gradation correction coefficient table means. The gain calculation section 304 serves as noise correction coefficient calculation means, noise information acquiring means, and gain calculation means. The noise constant term calculation section 305 serves as noise correction coefficient calculation means, noise information acquiring means and noise constant term calculation means. The noise information feed section 306 serves as noise correction coefficient calculation means and noise information feed means. The noise correction coefficient table 307 serves as noise correction coefficient calculation means and noise correction coefficient table means. The edge enhancement amount calculation section 308 serves as edge correction coefficient calculation means, edge information acquiring means, and edge highlight amount calculation means. The edge constant term calculation section 309 serves as edge correction coefficient calculation means, edge information acquiring means and edge constant term calculation means. The edge information feed section 310 serves as edge correction coefficient calculation means and edge information feed means. The edge correction coefficient table 311 serves as edge correction coefficient calculation means and edge correction coefficient table means.

The control section 116 is connected to the luminance level calculation section 300, the gradation constant term calculation section 301, the gradation information feed section 302, the gradation correction coefficient table 303, the gain calculation section 304, the noise constant term calculation section 305, the noise information feed section 306, the noise correction coefficient table 307, the edge enhancement amount calculation section 308, the edge constant term calculation section 309, the edge information feed section 310, and the edge correction coefficient table 311 bi-directionally so as to be controlled thereby.

Next, the operation of the correction coefficient calculation section 111 will be described.

The luminance level calculation section 300 reads the shutter speed and the aperture value upon the shooting from the control section 116, and calculates the EV (Exposure Value) based on the aforementioned information. The luminance level calculation section 300 classifies the luminance level upon the shooting into an average level (10 EV or higher), a dim level (5 EV to 9 EV), and a dark level (4 EV or lower). Then the luminance level calculation section 300 transfers the classified results to the gradation constant term calculation section 301.

Under the control of the control section 116, the gradation constant term calculation section 301 reads the classification result of the luminance level upon the shooting from the luminance level calculation section 300, and sets the constant term value used for the visual system adaptation model based on the classification result. The set constant term is transferred to the gradation correction coefficient table 303.

The visual system adaptation model is formed by modeling the process of the retina to change its sensitivity from the outer luminance level to the different luminance level. The model includes the adaptation in the uniform visual field, and the adaptation to the complicated visual field. The former case is intended to model the adaptation to the change in the luminance level in the outer field while keeping the uniformity. The latter case is intended to model the adaptation to the change in the luminance level of the image formed in the fovea of retina in the outer field with non-uniform luminance level by moving one's eyes. The former model for the adaptation in the uniform visual field becomes a space invariant model, and the latter model for the adaptation to the complicated visual field becomes a space variant model. Therefore, the adaptation model which includes both cases becomes the space variant model.

In the embodiment, the visual system adaptation model defined by CIECAM02 having the constant terms of c1 and c2 is employed. The gradation constant term calculation section 301 sets the constant term c1 to 0.69 when the luminance level upon shooting is the average level, 0.59 when the luminance level is the dim level, and 0.525 when the luminance level is the dark level each as the value conforming to the standard of CIECAM02. Another constant term c2 is set to the value of 1.48 which is independent from the luminance level upon the shooting.

When the constant terms c1 and c2 cannot be set because at least one of the shutter speed and the aperture value upon the shooting is unknown, the gradation information feed section 302 transfers the constant terms c1 set to 0.69 and c2 set to 1.48 as the standard values having the luminance level upon the shooting corresponding to the average level to the gradation correction coefficient table 303.

The gradation correction coefficient table 303 is structured to read the low frequency component $L_i(x,y)$ (x denotes the coordinate position in x-direction, y denotes the coordinate position in y-direction) at the ith decomposition stage from the buffer 110 for each pixel sequentially under the control of the control section 116 to output a gradation correction coefficient $T_i(x,y)$ corresponding to the constant term values c1, c2 set by the gradation constant term calculation section 301 or the gradation information feed section 302.

The gradation correction coefficient table 303 is structured based on the visual system adaptation model. The lightness J after the adaptation to the visual system in CIECAM02 may be derived from the following equation 3:

$$J = 100\left(\frac{A}{A_w}\right)^{c1\left(c2+\sqrt{\frac{Y_b}{Y_w}}\right)}$$ [Equation 3]

where A denotes an achromatic response of a subject, $A_w$ denotes an achromatic response of a white point, c1 denotes a constant term of an exponential nonlinearity, c2 denotes a constant term, $Y_b$ denotes a tristimulus value on the background, and $Y_w$ denotes a tristimulus value of the white point.

Assuming that the low frequency component at the ith decomposition stage, that is, $L_i(x,y)$ changes into $L'_i(x,y)$ resulting from the visual system adaptation based on the equation 3, the aforementioned change may be expressed by the following equation 4:

$$L'_i(x, y) = D_{max}\left(\frac{L_i(x, y)}{D_{max}}\right)^{c1\left(c2+\sqrt{\frac{L_i(x,y)}{D_{max}}}\right)}$$ [Equation 4]

where $D_{max}$ denotes a maximum value of the gradation range of the image signal, and c1 and c2 denote the constant terms, respectively.

In this case, the gradation correction coefficient $T_i(x,y)$ upon the visual system adaptation is calculated through the following equation 5.

$$T_i(x, y) = \frac{L'_i(x, y)}{L_i(x, y)} = \frac{D_{max}\left(\frac{L_i(x, y)}{D_{max}}\right)^{c1\left(c2+\sqrt{\frac{L_i(x,y)}{D_{max}}}\right)}}{L_i(x, y)}$$ [Equation 5]

FIG. 4 represents the visual system adaptation models in correlation with the low frequency component $L_i(x,y)$ and the gradation correction coefficient $T_i(x,y)$, which are calculated with respect to three constant terms c1 through the equation 5.

The gradation correction coefficient table 303 records the visual system adaptation models as shown in FIG. 4. The gradation correction coefficient $T_i(x,y)$ from the gradation correction coefficient table 303 is sequentially transferred to the correction processing section 112.

Although the adaptation model conforming to the CIECAM02 has been described, it is not limited to the model as described above. For example, RLAB model which allows easier calculation may be employed. Alternatively, the complicated model such as image appearance model may also be employed.

In the RLAB model, the lightness J after the adaptation may be derived from the equation 6.

$$J=100(Y_{ref})^\sigma \qquad \text{[Equation 6]}$$

The term $Y_{ref}$ in the equation 6 denotes the tristimulus value under the standard observation condition for the subject, and σ denotes the constant term which is set to 1/2.3 when the luminance level upon the shooting is at the average level, set to 1/2.9 when the luminance level upon the shooting is at the dim level, and set to 1/3.5 when the luminance level upon the shooting is at the dark level, respectively.

Assuming that the low frequency component $L_i(x,y)$ at the ith decomposition stage is changed to $L'_i(x,y)$ resulting from the visual system adaptation based on the equation 6, the change may be expressed by the following equation 7:

$$L'_i(x, y) = D_{max}\left(\frac{L_i(x, y)}{D_{max}}\right)^\sigma \qquad \text{[Equation 7]}$$

where $D_{max}$ denotes the maximum value of the gradation range of the image signal, and σ denotes the constant term.

The gradation correction coefficient $T_i(x,y)$ for the visual system adaptation may be calculated through the following equation 8.

$$T_i(x, y) = \frac{L'_i(x, y)}{L_i(x, y)} = \frac{D_{max}\left(\frac{L_i(x, y)}{D_{max}}\right)^\sigma}{L_i(x, y)} \qquad \text{[Equation 8]}$$

Returning to the explanation, referring to FIG. 3, the gain calculation section 304 reads the information with respect to the ISO sensitivity and the exposure condition from the control section 116 to obtain the amplification amount in the amplifier 103. The obtained amount is transferred to the noise constant term calculation section 305 as the gain value g.

The noise constant term calculation section 305 sets values of constant terms $\alpha_{gt}, \beta_{gt}, \gamma_{gt}$ used for the estimation model of the noise amount based on the gain value g from the gain calculation section 304 and the temperature value t of the CCD 102 from the temperature sensor 118 obtained through the control section 116. The thus set respective constant terms $\alpha_{gt}, \beta_{gt},$ and $\gamma_{gt}$ are transferred to the noise correction coefficient table 307.

When the constant terms $\alpha_{gt}, \beta_{gt},$ and $\gamma_{gt}$ cannot be set because at least one of the gain information and the temperature information is unknown, the noise information feed section 306 transfers the respective constant terms $\alpha_{gt}, \beta_{gt}$ and $\gamma_{gt}$ corresponding to the standard gain values and the standard temperature values to the noise correction coefficient table 307.

The noise correction coefficient table 307 reads the low frequency component $L_i(x,y)$ at the ith decomposition stage for each pixel sequentially from the buffer 110 under the control of the control section 116 to output the noise correction coefficient $N_i(x,y)$ corresponding to the constant terms $\alpha_{gt}, \beta_{gt},$ and $\gamma_{gt}$ set by the noise constant term calculation section 305 or the noise information feed section 306.

The noise correction coefficient table 307 is structured based on the noise amount estimation model as disclosed in Japanese Unexamined Patent Application Publication No. 2004-72422. According to the noise amount estimation model, the relationship between the signal level L and the noise amount N is modeled through the quadratic function as shown in the following equation 9 having the terms t and g set as the temperature value and the gain value, respectively.

$$N=\alpha_{gt}L^2+\beta_{gt}L+\gamma_{gt} \qquad \text{[Equation 9]}$$

where $\alpha_{gt}, \beta_{gt},$ and $\gamma_{gt}$ are constant terms defined by the temperature value t and the gain value g.

The relationship of the noise correction coefficient $N_i(x,y)$ to the low frequency component $L_i(x,y)$ at the ith decomposition stage is expressed by the following equation 10 based on the aforementioned equation 9:

$$N_i(x,y)=\alpha_{gt}L_i(x,y)^2+\beta_{gt}L_i(x,y)+\gamma_{gt} \qquad \text{[Equation 10]}$$

FIG. 5 represents the noise amount estimation model of the relationship between the low frequency component $L_i(x,y)$ and the noise correction coefficient $N_i(x,y)$, which has been calculated with respect to three gain values g and three temperature values t based on the equation 10.

The noise correction coefficient table 307 records the noise amount estimation model as shown in FIG. 5. The noise correction coefficient $N_i(x,y)$ from the noise correction coefficient table 307 is sequentially transferred to the correction processing section 112.

The edge enhancement amount calculation section 308 reads the edge enhancement amount and the ISO sensitivity set through the external I/F section 117 upon shooting from the control section 116 to set the edge enhancement level. The thus set edge enhancement level is further transferred to the edge constant term calculation section 309.

The edge constant term calculation section 309 reads the edge enhancement level from the edge enhancement amount calculation section 308 under the control of the control section 116, and sets the constant term values g, δ, ε, and ζ used for the edge enhancement model based on the read edge enhancement level. The edge constant term calculation section 309 transfers the thus set constant terms g, δ, ε, and ζ to the edge correction coefficient table 311.

When the constant terms g, δ, ε, and ζ cannot be set because at least one of the edge enhancement amount and the ISO sensitivity information is unknown, the edge information feed section 310 transfers the constant terms g, δ, ε, and ζ corresponding to the standard edge enhancement amount and the standard ISO sensitivity to the edge correction coefficient table 311.

The edge correction coefficient table 311 reads the number of the decomposition stage i from the control section 116 under its control to output the edge correction coefficient $E_i(x,y)$ corresponding to the constant terms g, δ, ε, and ζ set by the edge constant term calculation section 309 or the edge information feed section 310.

The edge correction coefficient table 311 is structured based on the edge enhancement model. According to the edge enhancement model, the relationship between the number i of the decomposition stage and the edge correction coefficient $E_i(x,y)$ is expressed by the following equation 11.

$$E_i(x,y)=g(\delta i^2+\epsilon i+\zeta) \qquad \text{[Equation 11]}$$

FIG. 6 represents the edge enhancement model with respect to the relationship between the number i of the decomposition stage and the edge correction coefficient $E_i(x,y)$, which has been calculated with respect to three values of the edge enhancement levels based on the equation 11.

The edge correction coefficient table 311 records the edge enhancement model as shown in FIG. 6. Each of the edge correction coefficients $E_i(x,y)$ from the edge correction coefficient table 311 is sequentially transferred to the correction processing section 112.

An exemplary structure of the correction processing section 112 will be described referring to FIG. 7.

The correction processing section 112 includes a switching unit 400, an adder 401, a subtractor 402, a replacement section 403, a multiplier 404, a standard value feed section 405, a multiplier coefficient calculation section 406, a multiplier coefficient correction section 407, and an upper limit value calculation section 408.

The correction coefficient calculation section 111 is connected to the switching unit 400, the adder 401, the subtractor 402, and the multiplier coefficient calculation section 406, respectively. The standard value feed section 405 is connected to the switching unit 400, the adder 401, the subtractor 402, and the multiplier coefficient calculation section 406, respectively. The buffer 110 is connected to the switching unit 400. The switching unit 400 is connected to the adder 401, the subtractor 402, and the replacement section 403, respectively. The adder 401, the subtractor 402, and the replacement section 403 are connected to the multiplier 404, respectively. The multiplier 404 is connected to the buffer 110. The multiplier coefficient calculation section 406 and the upper limit value calculation section 408 are connected to the multiplier coefficient correction section 407, respectively. The multiplier coefficient correction section 407 is connected to the multiplier 404.

The adder 401, the subtractor 402 and the replacement section 403 constitute core ring means. The multiplier 404 serves as multiplication means. The standard value feed section 405 serves as standard value feed means. The multiplier coefficient calculation section 406 serves as multiplier coefficient calculation means. The multiplier coefficient correction section 407 serves as multiplier coefficient correction means. The upper limit value calculation section 408 serves as upper limit value calculation means.

The control section 116 is connected to the switching unit 400, the adder 401, the subtractor 402, the replacement section 403, the multiplier 404, the standard value feed section 405, the multiplier coefficient calculation section 406, the multiplier coefficient correction section 407, and the upper limit value calculation section 408 bi-directionally so as to be controlled thereby.

The operation of the above-structured correction processing section 112 will be described.

A noise correction coefficient $N_i(x,y)$ from the correction coefficient calculation section 111 is transferred to the switching unit 400, the adder 401, and the subtractor 402, respectively. A gradation correction coefficient $T_i(x,y)$ and an edge correction coefficient $E_i(x,y)$ from the correction coefficient calculation section 111 are transferred to the multiplier coefficient calculation section 406.

Meanwhile, when any one of the gradation correction coefficient $T_i(x,y)$, the noise correction coefficient $N_i(x,y)$, and the edge correction coefficient $E_i(x,y)$ is not transferred, the standard value feed section 405 transfers the substituting standard value to the switching unit 400, the adder 401, the subtractor 402, and the multiplier coefficient calculation section 406 when needed under the control of the control section 116.

The switching unit 400 reads the three types of high frequency components, that is, $Hhv_i(x,y)$, $Hh_i(x,y)$, and $Hv_i(x,y)$ corresponding to the number i of the decomposition stage from the buffer 110 under the control of the control section 116, and further reads the noise correction coefficient $N_i(x,y)$ from the correction coefficient calculation section 111 or the standard value feed section 405. As each of the three types of the high frequency component $Hhv_i(x,y)$, $Hh_i(x,y)$ and $Hv_i(x,y)$ will be subjected to the same process, they will be referred to as the $H_i(x,y)$ hereinafter.

The switching unit 400 compares the high frequency component $H_i(x,y)$ with the noise correction coefficient $N_i(x,y)$. If the comparison results shows that $-N_i(x,y) > H_i(x,y)$, the high frequency component $H_i(x,y)$ is transferred to the adder 401. If $H_i(x,y) > N_i(x,y)$, it is transferred to the subtractor 402. If $N_i(x,y) \geq H_i(x,y) \geq -N_i(x,y)$, it is transferred to the replacement section 403.

When the high frequency component $H_i(x,y)$ is transferred from the switching unit 400, the adder 401 reads the noise correction coefficient $N_i(x,y)$ from the correction coefficient calculation section 111 or the standard value feed section 405 to add the noise correction coefficient $N_i(x,y)$ to the high frequency component $H_i(x,y)$, and the corrected high frequency component $H'_i(x,y)$ is transferred to the multiplier 404 under the control of the control section 116.

When the high frequency component $H_i(x,y)$ is transferred from the switching unit 400, the subtractor 402 reads the noise correction coefficient $N_i(x,y)$ from the correction coefficient calculation section 111 or the standard value feed section 405 to subtract the noise correction coefficient $N_i(x,y)$ from the high frequency component $H_i(x,y)$, and the corrected high frequency component $H'_i(x,y)$ to the multiplier 404 under the control of the control section 116.

When the high frequency component $H_i(x,y)$ is transferred from the switching unit 400, the replacement section 403 replaces the high frequency component $H_i(x,y)$ with 0, and the corrected high frequency component $H'_i(x,y)$ is transferred to the multiplier 404 under the control of the control section 116.

The aforementioned three kinds of processing may be expressed by the following equation 12.

$$H'_i(x, y) = \begin{cases} H_i(x, y) + N_i(x, y) & (-N_i(x, y) > H_i(x, y)) \\ H_i(x, y) - N_i(x, y) & (H_i(x, y) > N_i(x, y)) \\ 0 & (N_i(x, y) \geq H_i(x, y) \geq -N_i(x, y)) \end{cases}$$ 
[Equation 12]

The multiplier coefficient calculation section 406 reads the gradation correction coefficient $T_i(x,y)$ and the edge correction coefficient $E_i(x,y)$ from the correction coefficient calculation section 111 under the control of the control section 116, and multiplies the coefficients through the following equation 13 to calculate a multiplier coefficient k. The calculated multiplier coefficient k is transferred to the multiplier coefficient correction section 407.

$$k = T_i(x,y) \cdot E_i(x,y)$$ 
[Equation 13]

The upper limit value calculation section 408 reads the number i of the decomposition stage from the control section 116 under the control thereof to set the upper limit value of the multiplier coefficient based on the number i of the decomposition stage. The thus set upper limit value is transferred to the multiplier coefficient correction section 407. The upper limit value is used for maintaining the continuity of the local region in the space variant process. That is, the upper limit value is set to be smaller as the number i of the decomposition stage is increased, that is, the frequency becomes lower.

The multiplier coefficient correction section 407 compares the multiplier coefficient from the multiplier coefficient calculation section 406 with the upper limit value from the upper limit value calculation section 408, and performs the correction to replace the multiplier coefficient with the upper limit value only when the multiplier coefficient exceeds the upper limit value. The multiplier coefficient correction section 407 transfers the corrected multiplier coefficient k' to the multiplier 404.

The multiplier 404 subjects the high frequency component $H'_i(x,y)$ which has been coring processed through the adder 401, the subtractor 402 and the replacement section 403 as shown by the equation 12, and the multiplier coefficient k' corrected by the multiplier coefficient correction section 407 to the multiplication process through the following equation 14 under the control of the control section 116.

$$H''_i(x,y) = k' \cdot H'_i(x,y) \quad \text{[Equation 14]}$$

The high frequency component $H''_i(x,y)$ which has been multiplied by the multiplier 404 is transferred to the buffer 110 so as to replace the high frequency component $H_i(x,y)$ before the correction.

Next, an exemplary structure of the multiresolution composition section 113 will be described referring to FIG. 8.

The multiresolution composition section 113 includes a data readout section 500, a switching unit 501, up-samplers 502, 503, 504 and 505, vertical high-pass filter 506, a vertical low-pass filter 507, a vertical high-pass filter 508, a vertical low-pass filter 509, up-samplers 510 and 511, a horizontal high-pass filter 512, a horizontal low-pass filter 513, a buffer 514, a data transfer control section 515, a basis function ROM 516, and a filter coefficient readout section 517.

The buffer 110 is connected to the switching unit 501 via the data readout section 500. The switching unit 501 is connected to the up-samplers 502, 503, 504 and 505, respectively. The up-samplers 502, 503, 504 and 505 are connected to the vertical high-pass filter 506, the vertical low-pass filter 507, the vertical high-pass filter 508, and the vertical low-pass filter 509, respectively. The vertical high-pass filter 506 and the vertical low-pas filter 507 are connected to the up-sampler 510, and the vertical high-pass filter 508 and the vertical low-pass filter 509 are connected to the up-sampler 511, respectively. The up-samplers 510 and 511 are connected to the horizontal high-pass filter 512 and the horizontal low-pass filter 513, respectively. The horizontal high-pass filter 512 and the horizontal low-pass filter 513 are connected to the buffer 514, respectively. The buffer 514 is further connected to the signal processing section 114 and the data transfer control section 515, respectively. The data transfer control section 515 is connected to the switching unit 501. The basis function ROM 516 is connected to the filter coefficient readout section 517. The filter coefficient readout section 517 is connected to the vertical high-pass filter 506, the vertical low-pass filter 507, the vertical high-pass filter 508, the vertical low-pass filter 509, the horizontal high-pass filter 512, and the horizontal low-pass filter 513, respectively.

The control section 116 is connected to the data readout section 500, the switching unit 501, the data transfer control section 515, and the filter coefficient readout section 517 bi-directionally so as to be controlled thereby.

Subsequently, the operation of the multiresolution composition section 113 will be described.

The basis function ROM 516 records the filter coefficients used for the inverse wavelet transformation such as Harr function and Daubechies function.

The filter coefficient readout section 517 reads the filter coefficient from the basis function ROM 516 under the control of the control section 116 to transfer the high-pass filter coefficient to the vertical high-pass filters 506 and 508, and the horizontal high-pass filter 512, and the low-pass filter coefficient to the vertical low-pass filters 507 and 509, and the horizontal low-pass filter 513, respectively.

After the filter coefficients are transferred to the respective high-pass and low-pass filters, the data readout section 500 reads the three high frequency components, that is, $Hhv''_n$, $Hh''_n$, and $Hv''_n$, and the low frequency component $L_n$ which have been corrected through the equation 14 under the control of the control section 116 from the buffer 110 so as to be transferred to the switching unit 501.

The selector 501 transfers the high frequency components $Hhv''_n$, $Hh''_n$, $Hv''_n$ and the low frequency component $L_n$ to the vertical high-pass filter 506, the vertical low-pass filter 507, the vertical high-pass filter 508, and the vertical low-pass filter 509 via the up-samplers 502, 503, 504, and 505, respectively so as to the vertical high-pass filter 506, the vertical low-pass filter 507, the vertical high-pass filter 508, and the vertical low-pass filter 509 perform the vertical filtering process.

The frequency components from the vertical high-pass filter 506 and the vertical low-pass filter 507 are transferred to the horizontal high-pass filter 512 via the up-sampler 510, and the frequency components from the vertical high-pass filter 508 and the vertical low-pass filter 509 are transferred to the horizontal low-pass filter 513 via the up-sampler 511 so that the horizontal filtering process is performed.

The frequency components from the horizontal high-pass filter 512 and the horizontal low-pass filter 513 are transferred to the buffer 514 so as to be composed into a single component, resulting in the corrected low frequency component $L''_{n-1}$.

The up-samplers 502, 503, 504 and 505 are twice up-sample the inputted frequency component in the vertical direction. The up-samplers 510 and 511 are used to expand the sample rate of the inputted frequency component twice in the horizontal direction.

The data transfer control section 515 reads the low frequency component $L''_{n-1}$ from the buffer 514, and transfers the thus read low frequency component $L''_{n-1}$ to the switching unit 501 under the control of the control section 116.

The data readout section 500 reads the three corrected high frequency component $Hhv''_{n-1}$, $Hh''_{n-1}$, and $Hv''_{n-1}$ from the buffer 110 so as to be transferred to the switching unit 501 under the control of the control section 116.

Thereafter, the same filtering process as described above is performed with respect to the frequency components at the n−1th decomposition stage such that the low frequency component $L''_{n-2}$ is outputted to the buffer 514. The process is repeatedly performed under the control of the control section 116 until the composition at the predetermined nth stage is performed.

Finally the corrected low frequency component $L''_0$ is outputted to the buffer 514 where the low frequency component $L''_0$ is transferred as the corrected image signal to the signal processing section 114.

As described above, the gradation correction process and the noise reducing process are performed differently at each local region in a space variant manner. The edge enhancement process is uniformly performed on the entire signal in the space invariant manner. However, the process is not limited to the aforementioned structure. For example, the gradation correction coefficient $T_i(x,y)$ as represented by the equation 15 may be employed instead of the equation 5:

$$T_i(x, y) = \frac{L}{L_{av}}$$ [Equation 15]

where L denotes a predetermined target luminance level, and $L_{av}$ denotes the average value of the low frequency components $L_i(x,y)$.

The use of the gradation correction coefficient $T_i(x,y)$ as expressed by the equation 15 allows the gradation correction process to be performed uniformly on the entire signal in the space invariant manner.

In the edge enhancement process, the edge enhancement amount $E_i(x,y)$ is changed in accordance with the signal level to reduce the influence of the noise such as the dark area. As a result, the edge enhancement process may be differently performed at each local region in the space variant manner.

Each process structure may be arbitrarily set in consideration with the processing time and the image quality.

The digital camera has been described as the image processing system as shown in FIG. 1 which is integrated with the image pickup section including the lens system 100, the aperture 101, the CCD 102, the amplifier 103, the A/D converter 104, the exposure control section 106, the focus control section 107, the AF motor 108 and the temperature sensor 118.

However, the image processing system is not limited to the one as described above. For example, it may be structured separately from the image pickup section as shown in FIG. 9. That is, in the image processing system shown in FIG. 9, the image signal is picked up by the separate image pickup section, and recorded in the recording medium such as the memory card in the form of unprocessed Raw data. The image signal is then read from the recording medium so as to be processed. In this case, the accompanying information including the temperature of the image pickup device, the exposure condition and the image processing condition upon shooting is assumed to be recorded in the recording medium as the header portion. Various types of the information may be transferred from the separate image pickup section to the image processing system not only through the recording medium but also through the communication line.

The image processing system shown in FIG. 9 is formed by omitting the lens system 100, the aperture 101, the CCD 102, the amplifier 103, the A/D converter 104, the exposure control section 106, the focus control section 107, the AF motor 108, and the temperature sensor 118 from the image processing system shown in FIG. 1, and adding an input section 600 and a header information analysis section 601 thereto. As any other basic structure of the image processing system shown in FIG. 9 is the same as that of the image processing system shown in FIG. 1, the same structure is designated with the same description and the same reference numerals, and the explanation thereof, thus will be omitted. The portion different from the one shown in FIG. 1 will only be described hereinafter.

The input section 600 is connected to the buffer 105 and the header information analysis section 601. The control section 116 is connected to the input section 600 and the header information analysis section 601 bi-directionally so as to control the respective sections.

Next, the different operation of the image processing system shown in FIG. 9 will be described hereinafter.

Upon start of the processing through the external I/F section 117 such as the mouse and keyboard, the image signal and the header information stored in the recording medium, for example, the memory card are read through the input section 600.

Among the information read from the input section 600, the image signal is transferred to the buffer 105, and the header information is transferred to the header information analysis section 601, respectively.

The header information analysis section 601 extracts the information upon shooting (including the image pickup device temperature, the exposure condition, and the image processing condition) based on the header information which has been transferred from the input section 600 so as to be transferred to the control section 116.

The further process is the same as that of the image processing system shown in FIG. 1.

The process is expected to be performed using the hardware. However, it is not limited to the aforementioned structure. For example, the image signal from the CCD 102 is recorded in the recording medium such as the memory card as the unprocessed Raw data, and the accompanying information such as the shooting condition (for example, the image pickup device temperature, the exposure condition, the image processing condition upon shooting from the control section 116) may be recorded in the recording medium as the header information. Then the computer is allowed to execute the image processing program as the separate software such that the information stored in the recording medium is read and processed by the computer. Various types of information from the image pickup section to the computer may be transferred not only through the recording medium, but also through the communication line.

The main routine of the process executed by the image processing program will be described referring to FIG. 10.

Upon start of the process, first, the image signal is read as well as the header information including the image pickup device temperature, the exposure condition and the image processing condition (step S1).

Next, the variable i as the number of the decomposition stage is initialized to 0 (step S2).

The number i of the decomposition stage is incremented by 1 (step S3).

Then the resolution decomposition is performed with respect to the number i of the decomposition stage so as to obtain the high frequency component and the low frequency component (step S4).

The gradation correction coefficient, the noise correction coefficient and the edge correction coefficient for various image processings are calculated to be described later referring to FIG. 11 (step S5).

Thereafter, the gradation correction coefficient is multiplied by the edge correction coefficient through the equation 13 so as to calculate the multiplier coefficient (step S6).

The upper limit value of the multiplier coefficient is set based on the number i of the decomposition stage with which the multiplier coefficient is corrected (step S7).

The coring process is performed with respect to the high frequency component at the ith decomposition stage as expressed by the equation 12 (step S8).

The multiplication as expressed by the equation 14 is performed with respect to the high frequency component at the ith decomposition stage which has been subjected to the coring process (step S9).

The high frequency component which has been multiplied at the ith decomposition stage is outputted (step S10).

It is determined whether or not the number i of the decomposition stage is equal to the specified number n or smaller (step S11). When it is equal to or smaller than the number n, the process returns to step S3 where the process with respect to the number of the next decomposition stage will be repeatedly performed.

When it is determined that the number i of the decomposition stage exceeds the specified number n, the low frequency component is outputted (step S12).

The multiresolution composition is performed at the nth stage using the corrected high frequency component and the low frequency component to generate the corrected image signal (step S13).

Then the known compression process is performed (step S14), and the processed image signal is outputted (step S15) to end the routine.

Next, the routine of the process for calculating the correction coefficient in step S5 shown in FIG. 10 will be described referring to FIG. 11.

Upon start of the process in step S5 shown in FIG. 10, the EV (Exposure Value) upon the shooting is calculated as the luminance level based on the exposure condition of the header information (step S20).

The luminance level is classified, and the constant term value used for the visual system adaptation model is set based on the classified result (step S21). When the required parameter does not exist in the header information, the process for allocating the predetermined standard value is performed.

The gradation correction coefficient table structured based on the equation 5 is read (step S22) to output the gradation correction coefficient (step S23).

The gain with respect to the image signal upon the shooting is obtained based on the exposure condition of the header information (step S24).

Based on the obtained gain and the image pickup device temperature information of the header information, the constant term value used for the noise amount estimation model is set (step S25). When the required parameter does not exist in the header information, the process for allocating the predetermined standard value is performed.

Thereafter, the noise correction coefficient table structured based on the equation 10 is read (step S26) to output the noise correction coefficient (step S27).

The edge enhancement amount is obtained based on the image processing condition contained in the header information (step S28).

Based on the edge enhancement amount and the ISO sensitivity contained in the header information, the constant term value used for the edge enhancement model is set (step S29). When the required parameter does not exist in the header information, the process for allocating the predetermined standard value is performed.

The edge correction coefficient table structured based on the equation 11 is read (step S30) to output the edge correction coefficient (step S31) from where the process returns to the one shown in FIG. 10.

Embodiment 1 allows various types of space variant image processing, thus providing high definition image signal.

As the multiresolution decomposition is performed upon the image processing, the space variant process may be integrally performed with the maintenance of the continuity among local regions while reducing the processing time. Especially, the wavelet transformation is employed in Embodiment 1, which allows the use of various filters, and provides the high frequency component for each direction, thus providing the high-definition image signal with a high degree of freedom for performing various types of space variant processes.

As the correction coefficient used for various types of the space variant process is calculated based on a model, the parameter may be automatically set, thus performing the high speed optimum processing.

As the gradation correction is performed based on the visual system adaptation model, the optimum gradation correction may be made. The noise reducing process is performed based on the noise amount estimation model for the optimum noise reducing process. The edge enhancement process is performed based on the edge enhancement model for the optimum edge enhancement processing.

Embodiment 2

Figure 12:
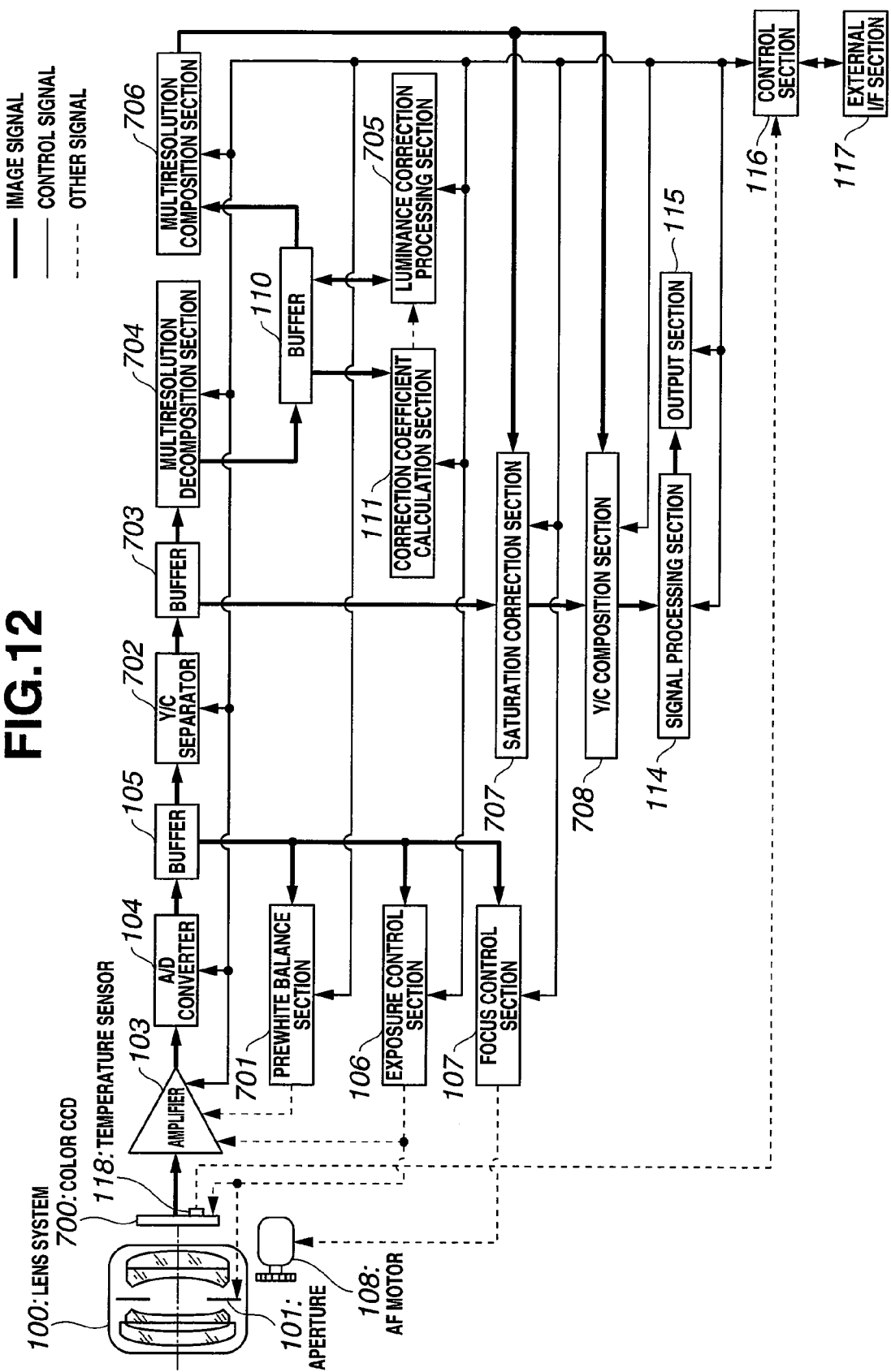
FIG. 12 is a block diagram showing a structure of an image processing system according to Embodiment 2 of the present invention.
Figure 13:
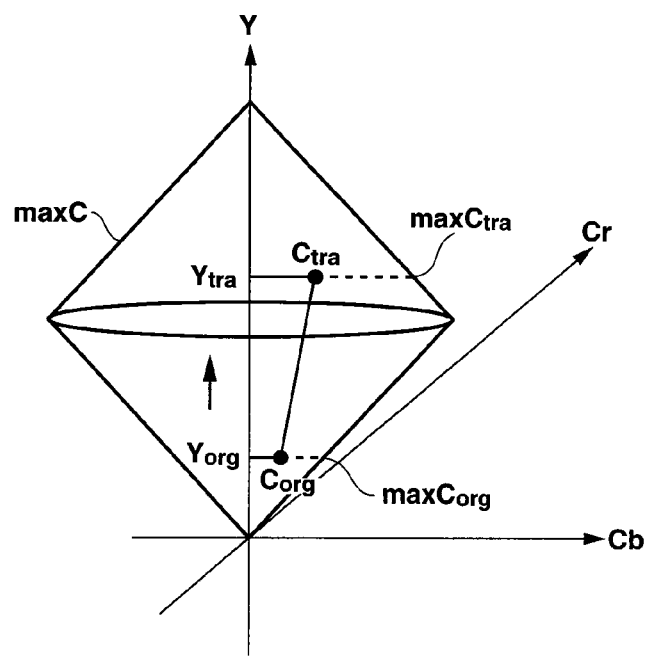
FIG. 13 is an explanatory view with respect to a saturation correction in the YCbCr color space according to Embodiment 2.
Figure 14:
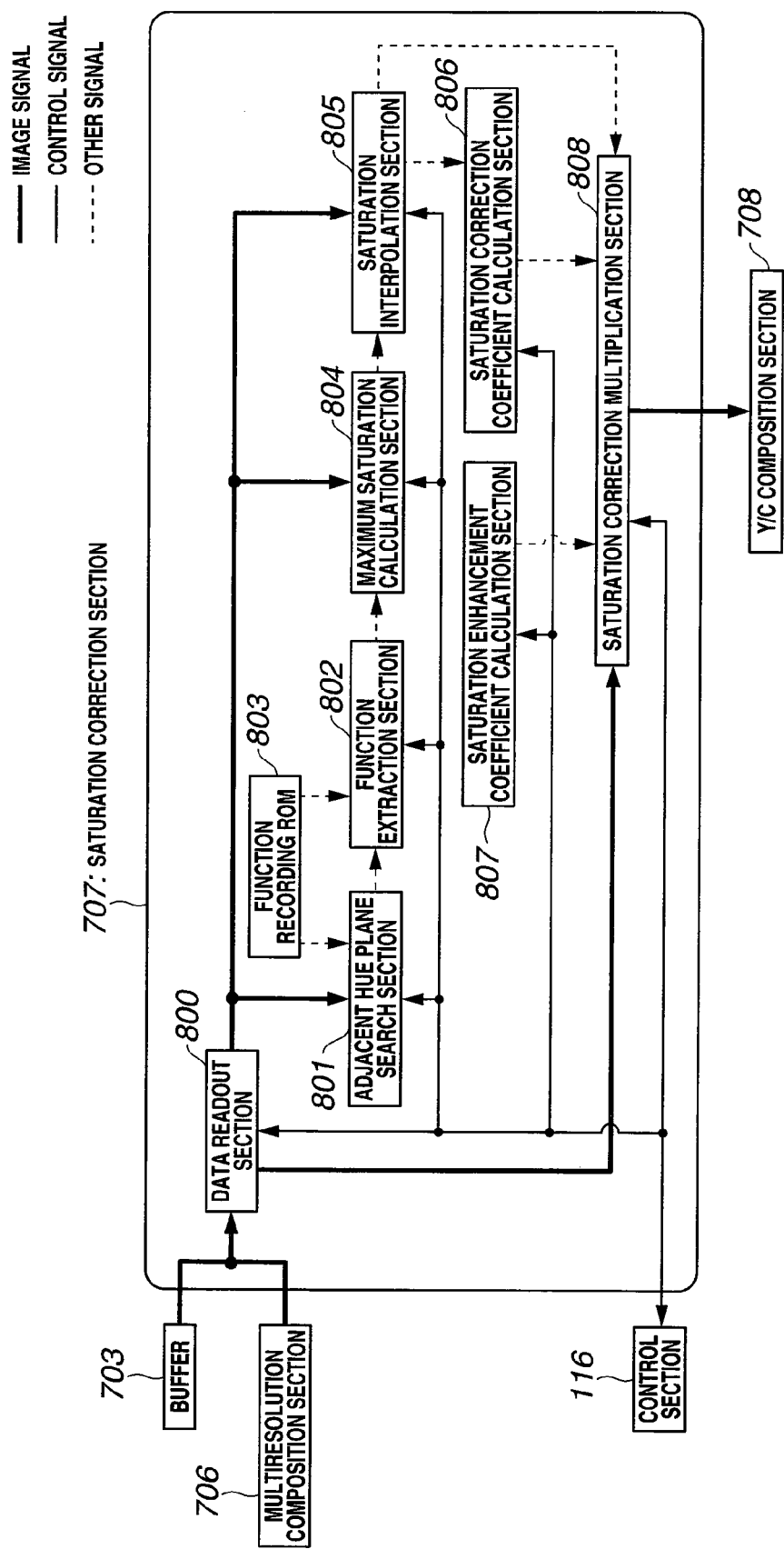
FIG. 14 is a block diagram showing a structure of a saturation correction section according to Embodiment 2.
Figure 17A:
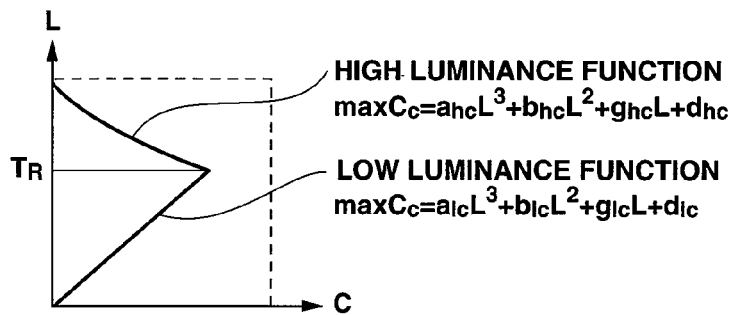
FIGS. 17A to 17G each show a line graph for explaining the maximum saturation value on each hue plane in CIE Lab color space according to Embodiment 2.
Figure 17B:
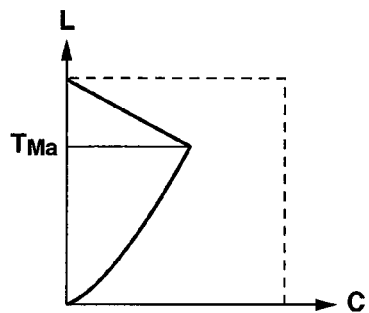
Figure 17C:
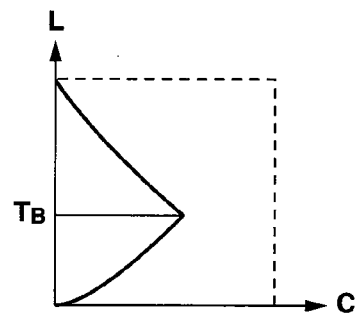
Figure 17D:
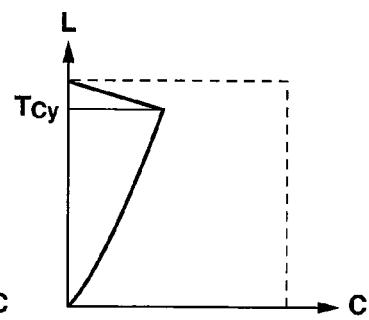
Figure 17E:
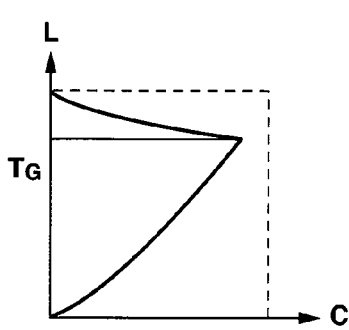
Figure 17F:
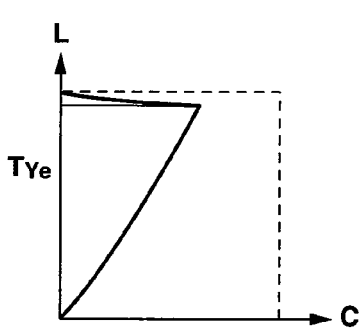
Figure 17G:
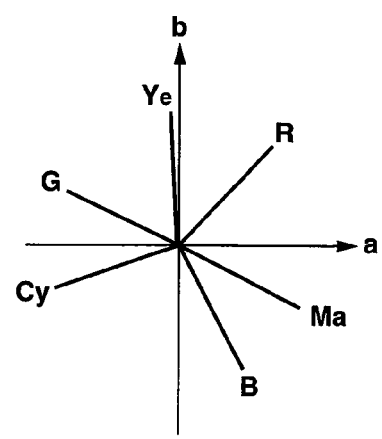
Figure 18:
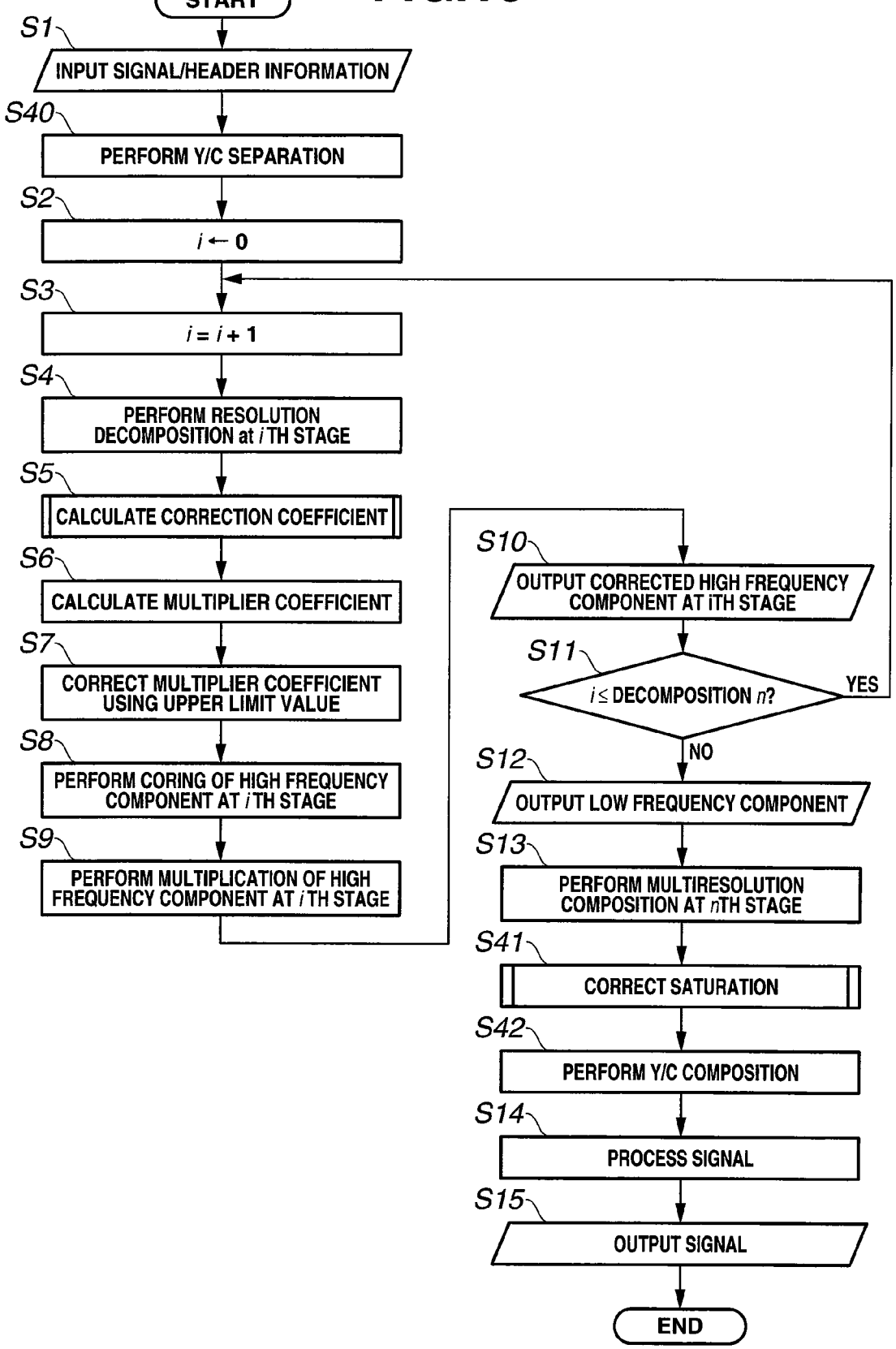
FIG. 18 is a flow chart showing an entire signal processing routine based on the image processing program according to Embodiment 2.
Figure 19:
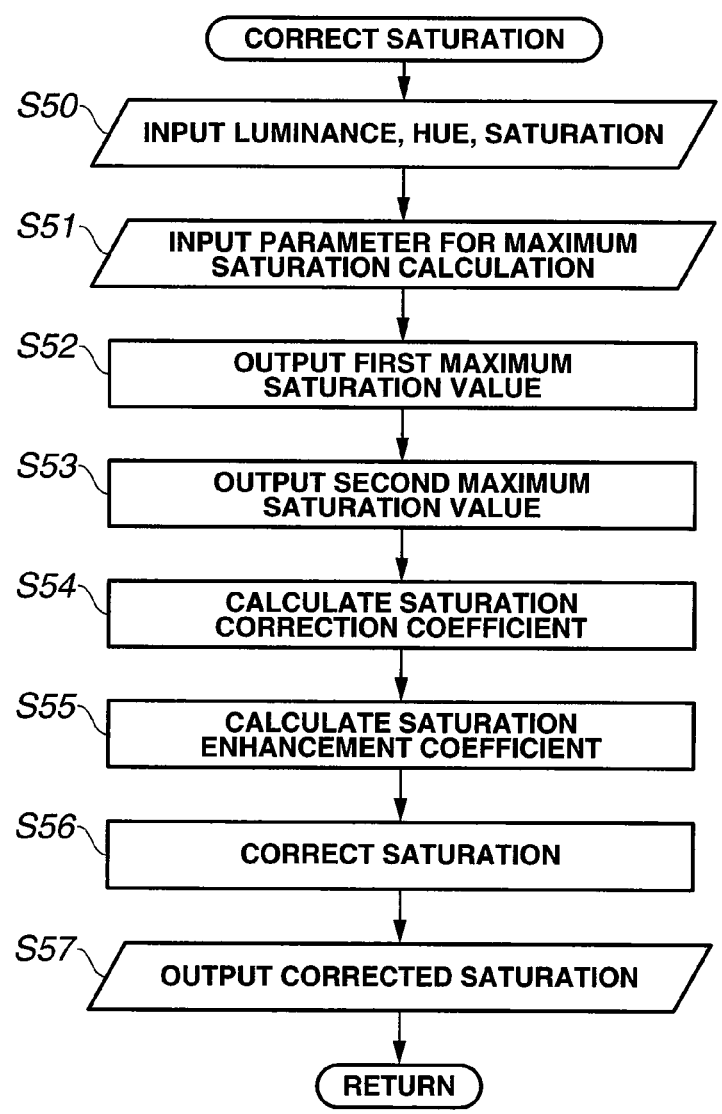
FIG. 19 is a flow chart showing a detail of saturation correction processing executed in step S41 shown in FIG. 18.

FIGS. 12 to 19 show Embodiment 2 according to the present invention. FIG. 12 is a block diagram showing a structure of an image processing system. FIG. 13 is an explanatory view with respect to a saturation correction in the YCbCr color space. FIG. 14 is a block diagram showing a structure of a saturation correction section. FIGS. 15A to 15G each show a line graph for explaining a maximum saturation value for each hue plane in YCbCr color space. FIG. 16 is a line graph for explaining calculation for interpolation of the maximum saturation on an intermediate hue plane. FIGS. 17A to 17G each show a line graph for explaining the maximum saturation value on each hue plane in CIE Lab color space. FIG. 18 is a flow chart showing an entire signal processing routine based on the image processing program. FIG. 19 is a flow chart showing a detail of saturation correction processing executed in step S41 shown in FIG. 18.

In Embodiment 2, the same components as those of Embodiment 1 will be designated with the same reference numerals, and explanations thereof, thus will be omitted. Only the components different from those of Embodiment 1 will be described hereinafter.

First, referring to FIG. 12, the structure of the image processing system applied to the digital camera will be described.

The image processing system shown in FIG. 12 is formed by partially changing the image processing system according to Embodiment 1 shown in FIG. 1. Specifically, the image processing system is formed by adding a prewhite balance section 701, a Y/C separator 702 as Y/C separator means, a buffer 703, a color saturation correction section 707 as saturation correction means, and a Y/C composition section 708 as Y/C composition means to the image processing system shown in FIG. 1, and replacing the CCD 102, the multiresolution decomposition section 109, the correction processing section 112, and the multiresolution composition section 113 with a color CCD 700, a multiresolution decomposition section 704 as multiresolution decomposition means, a luminance correction processing section 705 as correction means, and a multiresolution composition section 706 as multiresolution composition means, respectively. Other basic structure is the same as the one described in Embodiment 1, and the same structure will be designated with the same description and the same reference numeral.

Only, the structure which is different from that of Embodiment 1 will be described.

A color image signal captured via the lens system 100, the aperture 101, and the color CCD 700 is transferred to the amplifier 103.

The buffer 105 is connected to the exposure control section 106, the focus control section 107, the prewhite balance section 701, and the Y/C separator 702, respectively. The prewhite balance section 701 is connected to the amplifier 103. The Y/C separator 702 is connected to the buffer 703. The buffer 703 is connected to the multiresolution decomposition section 704 and the saturation correction section 707, respectively. The multiresolution decomposition section 704 is connected to the buffer 110. The buffer 110 is connected to the correction coefficient calculation section 111 and the multiresolution composition section 706, respectively, and further connected to the luminance correction processing section 705 bi-directionally. The correction coefficient calculation section 111 is connected to the luminance correction processing section 705. The multiresolution composition section 706 is connected to the saturation correction section 707 and the Y/C composition section 708, respectively. The saturation correction section 707 is connected to the Y/C composition section 708. The Y/C composition section 708 is connected to the signal processing section 114.

The signal from the temperature sensor 118 disposed in the vicinity of the color CCD 700 is connected to the control section 116.

The control section 116 is connected to the prewhite balance 701, the Y/C separator 702, the multiresolution decomposition section 704, the luminance correction processing section 705, the multiresolution composition section 706, the saturation correction section 707, and the Y/C composition section 708 bi-directionally so as to be controlled thereby.

Next, the operation of the image processing system shown in FIG. 12 will be described in reference to the flow of the image signal. The operation of the image processing system in Embodiment 2 is basically the same as that of Embodiment 1. So only the operation different from the one performed in Embodiment 1 will be described.

When the user presses the shutter button as the two-stage switch of the external I/F section 117 halfway, the digital camera is brought into the pre-shooting mode.

The subject image formed via the lens system 100 and the aperture 101 is photoelectrically converted by the color CCD 700 so as to be outputted as an analog color image signal.

The analog color image signal is amplified by the amplifier 103 in consideration with the ISO sensitivity and the white balance, and then is converted into the digital color image signal by the A/D converter 104 so as to be stored in the buffer 105.

In the embodiment, the single image pickup device having the Bayer-type primary color filter disposed to the front surface is employed as the color CCD 700. As the image pickup device, not only the CCD but also CMOS or other type of the image pickup device may be employed likewise Embodiment 1.

The color image signal stored in the buffer 105 is transferred to the exposure control section 106, the focus control section 107, and the prewhite balance section 701, respectively.

The prewhite balance section 701 multiplies each color signal in the predetermined level range among those stored in the buffer 105 (that is, accumulates) to calculate the simple white balance coefficient. The prewhite balance section 701 transfers the calculated coefficient to the amplifier 103 where the gain different for each color signal is multiplied to perform the white balance.

After performing the focus adjustment, the exposure adjustment, and the simple white balance adjustment, the user fully presses the shutter as the two-stage switch of the external I/F section 117. The digital camera is then brought into the real shooting mode.

The color image signal is transferred to the buffer 105 likewise the pre-shooting mode. The real shooting is performed under the shooting condition including the simple white balance coefficient obtained by the prewhite balance section 701, the exposure condition obtained by the exposure control section 106, and the focus condition obtained by the focus control section 107, which will be transferred to the control section 116.

The color image signal in the buffer 105 derived from the real shooting is transferred to the Y/C separator 702 first.

The Y/C separator 702 generates the color image signal formed of three colors of R, G and B through the known interpolation process under the control of the control section 116. The Y/C separator 702 separates the three-color image signal into the luminance signal Y and the color difference signals Cb and Cr under the control of the control section 116 as represented by the following equation 16.

$Y=0.29900R+0.58700G+0.11400B$ $Cb=-0.16874R-0.33126G+0.50000B$ $Cr=0.50000R-0.41869G-0.08131B$ [Equation 16]

Subsequently, the Y/C separator 702 calculates a luminance signal V, a hue signal H, a saturation signal C in the YCbCr color space through the following equation 17 based on the control of the control section 116.

$$V = Y$$
$$H = \tan^{-1}\left(\frac{Cb}{Cr}\right)$$
$$C = \sqrt{Cb^2 + Cr^2}$$ [Equation 17]

As is known by the equation 17, the luminance signal V is equal to Y of the YCbCr color space. Accordingly, the luminance signal will be referred to as Y instead of V. The luminance signal, the hue signal, and the saturation signal obtained by processing the color image signal from the color CCD 700 through the Y/C separator 702 will be designated as $Y_{org}$, $H_{org}$, and $C_{org}$, respectively. The luminance signal $Y_{org}$, the hue signal $H_{org}$, and the saturation signal $C_{org}$ are transferred to the buffer 703 so as to be stored therein.

The multiresolution decomposition section 704 reads the luminance signal $Y_{org}$ stored in the buffer 105 to perform the multiresolution decomposition at the predetermined nth stage (n: integer equal to or larger than 1) to generate the high frequency component and the low frequency component under the control of the control section 116. The multiresolution decomposition section 704 then transfers the generated high frequency component and the low frequency component to the buffer 110 sequentially.

The correction coefficient calculation section 111 reads the low frequency component at the ith decomposition stage (i: integer equal to or larger than 1, and equal to or smaller than n) under the control of the control section 116. The correction coefficient calculation section 111 receives inputs of the information relevant to the image processing including the shutter speed, the aperture value, the ISO sensitivity, and the white balance coefficient transferred from the control section 116. The correction coefficient calculation section 111 calculates a gradation correction coefficient for the gradation conversion process based on the low frequency component, the relevant information, and the visual system adaptation model, a noise correction coefficient for the noise reducing process based on the low frequency component, the relevant information and a noise amount estimation model, and an edge correction coefficient for the edge enhancement process based on the number i of the decomposition, the relevant information, and the edge enhancement model, respectively. Thereafter, the correction coefficient calculation section 111 transfers the calculated correction coefficients to the luminance correction processing section 705.

The luminance correction processing section 705 reads the high frequency component at the ith decomposition stage from the buffer 110, and the gradation correction coefficient, the noise correction coefficient and the edge correction coefficient from the correction coefficient calculation section 111, and corrects the high frequency component using the read correction coefficients likewise the process performed by the correction processing section 112 according to Embodiment 1 shown in FIG. 7. The luminance correction processing section 705 has substantially the same structure and function as those of the correction processing section 112 according to Embodiment 1 for processing the monochrome image signal except that the luminance signal is to be subjected to the process.

The high frequency component corrected by the luminance correction processing section 705 is transferred to the buffer 110 to overwrite the high frequency component before the correction.

Each process performed by the correction coefficient calculation section 111 and the luminance correction processing section 705 is performed in synchronization with each other at each ith decomposition stage under the control of the control section 116.

Upon completion of the correction with respect to the high frequency component at all the decomposition stages, the multiresolution composition section 706 reads the low frequency component and the corrected high frequency component from the buffer 110 under the control of the control section 116 to generate a corrected luminance signal $Y_{tra}$. The multiresolution composition section 706 transfers the corrected luminance signal $Y_{tra}$ to the saturation correction section 707 and the Y/C composition section 708, respectively.

In the embodiment, the known Gaussian pyramid and Laplacian pyramid using the Gaussian filter and the Laplacian filter are expected to be employed as the transformation process for the multiresolution decomposition process and the multiresolution composition process.

The saturation correction section 707 reads a luminance signal $Y_{org}$, the hue signal $H_{org}$, and the saturation signal $C_{org}$ from the buffer 703, and the corrected luminance signal $Y_{tra}$ from the multiresolution composition section 706, respectively under the control of the control section 116.

The saturation correction section 707 calculates a first maximum saturation value $maxC_{org}$ with respect to the inputted luminance signal $Y_{org}$ and the inputted hue signal $H_{org}$, and the second maximum saturation value $maxC_{tra}$ with respect to the corrected luminance signal $Y_{tra}$ and the inputted hue signal $H_{org}$.

The saturation correction section 707 further obtains a saturation correction coefficient $k_1$ for generating a saturation signal $C_{tra}$ corresponding to the corrected luminance signal $V_{tra}$ based on the calculated first and the second maximum saturation values $maxC_{org}$ and $maxC_{tra}$ through the following equation 18.

$$k_1 = \frac{maxC_{tra}}{maxC_{org}}$$ [Equation 18]

Thereafter, the saturation correction section 707 multiplies the saturation signal $C_{org}$ upon input by the saturation correction coefficient $k_1$ and a predetermined gain $k_2$ for the saturation enhancement to calculate the corrected saturation signal $C_{tra}$ through the following equation 19.

$$C_{tra} = min(k_1 k_2 C_{org}, maxC_{tra})$$ [Equation 19]

where the code min(x,y) in the right side denotes that either value which is not larger than the other may be selected.

As the equation 19 shows, when the value obtained by multiplying the inputted saturation signal $C_{org}$ by the saturation correction coefficient $k_1$ and the gain $k_2$ for the saturation enhancement exceeds the second maximum saturation value $maxC_{tra}$, the saturation correction section 707 replaces the $maxC_{tra}$ with the calculated result so as to be set as the corrected saturation signal $C_{tra}$.

Here, the outer configuration of the YCbCr color space and the correction coefficient $k_1$ in the equation 18 will be described referring to FIG. 13.

The set of the maximum saturation value maxC accords with the outer configuration (contour) of the YCbCr color space as the three-dimensional space, which has the two-dimensional closed plane. Therefore, when the luminance Y and the hue H are set to the specific values, the maximum saturation value maxC in the YCbCr color space may be determined.

In the YCbCr color space, in the case where only the luminance signal Y is converted while keeping the hue H constant, it is known by the study that the color may be naturally reproduced by correcting the saturation signal C to make the ratio with respect to the maximum saturation value maxC constant. As the saturation C is multiplied by the correction coefficient k1 as shown in the equation 18, the correction accompanied with the change in the luminance signal Y may be performed.

The saturation correction section 707 transfers the thus corrected saturation signal $C_{tra}$ and the hue signal $H_{org}$ to the Y/C composition section 708.

The Y/C composition section 708 reads the saturation signal $C_{tra}$ and the hue signal $H_{org}$ corrected by the saturation correction section 707, and the luminance signal $Y_{tra}$ corrected by the multiresolution composition section 706, respectively.

The Y/C composition section 708 obtains the corrected YCbCr signal (Y'Cb'Cr' signal) as expressed by the following equation 20.

$$Y' = Y_{tra}$$

$$Cb' = C_{tra} \cdot sin(H_{org})$$

$$Cr' = C_{tra} \cdot cos(H_{org})$$ [Equation 20]

The Y/C composition section 708 converts the Y'Cb'Cr' signal into the corrected RGB signal (R'G'B' signal) as expressed by the equation 21.

$$R' = Y' + 1.40200 Cr'$$

$$G' = Y' - 0.34414 Cb' - 0.71414 Cr'$$

$$B' = Y' + 1.77200 Cb'$$ [Equation 21]

The Y/C composition section 708 transfers the thus calculated R'G'B' signal to the signal processing section 114.

The signal processing section 114 performs the known compression process and the like to the corrected color image signal outputted from the Y/C composition section 708, and transfers the processed signal to the output section 115 under the control of the control section 116.

The output section 115 records the image signal outputted from the signal processing section 114 in the recording medium such as the memory card so as to be stored therein.

Next, an exemplary structure of the saturation correction section 707 will be described referring to FIG. 14.

The saturation correction section 707 includes a data readout section 800, an adjacent hue plane search section 801, a function extraction section 802, a function recording ROM 803, a maximum saturation calculation section 804, a saturation interpolation section 805, a saturation correction coefficient calculation section 806, a saturation enhancement coefficient calculation section 807, and a saturation coefficient multiplier 808.

The buffer 703 and the multiresolution composition section 706 are connected to the data readout section 800, respectively. The data readout section 800 is connected to the adjacent hue plane search section 801, the maximum saturation calculation section 804, the saturation interpolation section 805, and the saturation coefficient multiplier 808, respectively. The function recording ROM 803 is connected to the adjacent hue plane search section 801 and the function extraction section 802, respectively. The adjacent hue plane search section 801 is connected to the saturation interpolation section 805 via the function extraction section 802 and the maximum saturation calculation section 804. The saturation interpolation section 805 is connected to the saturation correction coefficient calculation section 806 and the saturation coefficient multiplier 808, respectively. The saturation correction coefficient calculation section 806 and the saturation enhancement coefficient calculation section 807 are connected to the saturation coefficient multiplier 808, respectively. The saturation coefficient multiplier 808 is connected to the Y/C composition section 708.

Among the aforementioned components, the adjacent hue plane search section 801, the function extraction section 802, the function recording ROM 803, the maximum saturation calculation section 804, the saturation interpolation section 805 constitute maximum saturation calculation means. The saturation correction coefficient calculation section 806 serves as saturation correction coefficient calculation means, the saturation enhancement coefficient calculation section 807 serves as saturation enhancement means, and the saturation coefficient multiplier 808 serves as both multiplication means and saturation enhancement means.

The control section 116 is connected to the data readout section 800, the adjacent hue plane search section 801, the function extraction section 802, the maximum saturation calculation section 804, the saturation interpolation section 805, the saturation correction coefficient calculation section 806, the saturation enhancement coefficient calculation section 807, and the saturation coefficient multiplier 808 bi-directionally so as to control the respective sections.

Subsequently, the function of the above structured saturation correction section 707 will be described.

The data readout section 800 reads the luminance signal $Y_{org}$, the hue signal $H_{org}$, and the saturation signal $C_{org}$ form the buffer 703, and the corrected luminance signal $Y_{tra}$ from the multiresolution composition section 706, respectively under the control of the control section 116.

The data readout section 800 transfers the hue signal $H_{org}$ to the adjacent hue plane search section 801 and the saturation interpolation section 805, the luminance signal $Y_{org}$ and the corrected luminance signal $Y_{tra}$ to the maximum saturation calculation section 804, the hue signal $H_{org}$ and the saturation signal $C_{org}$ to the saturation coefficient multiplier 808, respectively.

The function recording ROM 803 records the function information with respect to the maximum saturation value maxC. Referring to FIGS. 15A to 15G the function information with respect to the maximum saturation value maxC in the YCbCr color space recorded in the function recording ROM 803 will be described.

FIGS. 15A, 15B, 15C, 15D, 15E, 15F, and 15G show the saturation C and the luminance Y on the red (R) hue plane in the YCbCr color space, the saturation C and the luminance Y on the magenta (Ma) hue plane in the YCbCr color space, the saturation C and the luminance Y on the blue (B) hue plane in the YCbCr color space, the saturation C and the luminance Y on cyan (Cy) hue plane in the YCbCr color space, the saturation C and the luminance Y on the green (G) hue plane in the YCbCr color space, the saturation C and the luminance Y on the yellow (Ye) hue plane in the YCbCr color space, and the arrangement of the respective hue planes.

Referring to FIGS. 15A to 15F, the maximum saturation value maxC at the certain luminance Y increases as the luminance Y increases from 0, and takes the maximum value at the luminance $T_c$ (C=R, Ma, B, Cy, G, Ye) to be decreased to 0 again at the maximum luminance Y. Therefore, the luminance $T_c$ (C=R, Ma, B, Cy, G, Ye) corresponding to the maximum saturation value at the respective hue plane are set as the threshold value. The luminance equal to or higher than the luminance $T_c$ is modeled using the high luminance function. The luminance equal to or lower than the luminance $T_c$ is modeled using the low luminance function.

In the YCbCr color space as shown in FIGS. 15A to 15G, the linear function shown in the following equation 22 may be used as the function with respect to the maximum saturation value maxC.

$$\max C_c = \begin{cases} a_{hc}Y + b_{hc} & (Y > T_c) \\ a_{lc}Y + b_{lc} & (Y < T_c) \end{cases} \quad \text{[Equation 22]}$$

The function recording ROM 803 records the hue $H_c$, the luminance $T_c$, the parameters $a_{hc}$, $b_{hc}$ for the high luminance function, and parameters $a_{lc}$, $b_{lc}$ for the low luminance function.

The adjacent hue plane search section 801 reads the hue $H_c$ recorded in the function recording ROM 803 under the control of the control section 116.

The adjacent hue plane search section 801 compares the hue signal $H_{org}$ from the data readout section 800 with the hue $H_c$ from the function recording ROM 803 to search the nearest two pairs of the hues $H_j$, $H_k$ adjacent with each other (j, k=R, Ma, B, Cy, G, Ye; j≠k). Thereafter, the adjacent hue plane search section 801 transfers the searched two pairs of hues $H_j$, $H_k$ to the function extraction section 802.

The function extraction section 802 extracts the luminance values $T_j$, $T_k$ corresponding to the aforementioned two pairs of hues $H_j$, $H_k$, parameters for the high luminance function $a_{hj}$, $b_{hj}$, $a_{hk}$, and $b_{hk}$, and parameters for the low luminance function $a_{lj}$, $b_{lj}$, $a_{lk}$, and $b_{lk}$ from the function recording ROM 801, and transfers the extracted information to the maximums saturation calculation section 804 under the control of the control section 116.

The maximum saturation calculation section 804 calculates maximum saturation values $\max C_{org\_j}$, $\max C_{org\_k}$, or $\max C_{tra\_j}$, $\max C_{tra\_k}$ relevant to the two pairs of hues $H_j$, $H_k$ based on the parameters from the function extraction section 802, the luminance signal $Y_{org}$ from the data readout section 800, or the corrected luminance signal $Y_{tra}$.

As the subsequent process is the same for both the luminance signal $Y_{org}$ and the corrected luminance signal $Y_{tra}$, the two pairs of maximum saturation values will be referred to as $\max C_j$, $\max C_k$. The maximum saturation calculation section

804 transfers the calculated maximum saturation values $\max C_j$, $\max C_k$ to the saturation interpolation section 805.

The saturation interpolation section 805 obtains the maximum saturation values $\max C_j$, $\max C_k$, and the maximum saturation value maxC with respect to the hue signal $H_{org}$ from the data readout section 800 through the interpolation process under the control of the control section 116. Referring to FIG. 16, the calculation of the maximum saturation value maxC through the interpolation process will be described. The hue $H_{org}$ is assumed to establish the following relationship of the two pairs of hues $H_j$, $H_k$, that is, $H_j > H_{org} > H_k$.

The maximum saturation value maxC is calculated through the following equation 23.

$$\max C = \frac{\max C_k (H_j - H_{org})}{H_j - H_k} + \frac{\max C_j (H_{org} - H_k)}{H_j - H_k} \quad \text{[Equation 23]}$$

The calculation of the maximum saturation value through the equation 23 is performed once for the luminance signal $Y_{org}$ from the data readout section 800, and the corrected luminance signal $Y_{tra}$ (two times in total) to obtain a first maximum saturation value $\max C_{org}$ and a second maximum saturation value $\max C_{tra}$. The saturation interpolation section 805 transfers the calculated $\max C_{org}$ and $\max C_{tra}$ to the saturation correction coefficient calculation section 806, and the $\max C_{tra}$ to the saturation coefficient multiplier 808, respectively.

The saturation correction coefficient calculation section 806 reads the first and the second maximum saturation values $\max C_{org}$ and $\max C_{tra}$ from the saturation interpolation section 805, calculates the saturation correction coefficient $k_1$ as shown by the equation 18, and transfers the calculated saturation correction coefficient $k_1$ to the saturation coefficient multiplier 808 under the control of the control section 116.

The saturation enhancement coefficient calculation section 807 transfers a gain $k_2$ for a predetermined saturation enhancement, for example, $k_2 = 1.2$ to the saturation coefficient multiplier 808 under the control of the control section 116.

The saturation coefficient multiplier 808 corrects the saturation signal $C_{org}$ from the data readout section 800 through the equation 19 to calculate the corrected saturation signal $C_{tra}$ based on the second maximum saturation value $\max C_{tra}$ from the saturation interpolation section 805 and the saturation correction coefficient $k_1$ from the saturation correction coefficient calculation section 806, and the gain $k_2$ for the saturation enhancement from the saturation enhancement coefficient calculation section 807 under the control of the control section 116. The saturation coefficient multiplier 808 transfers the corrected saturation signal $C_{tra}$ and the hue signal $H_{org}$ from the data readout section 800 to the Y/C composition section 708.

In the aforementioned embodiment, the Gaussian filter and the Laplacian filter are used. However, the structure is thereto not limited. For example, the wavelet transformation may be employed likewise Embodiment 1.

In the aforementioned structure, the primary color single CCD is employed as the color image pickup device. However the image pickup device is not limited to the aforementioned structure. For example, the image pickup system using the complementary color single CCD, two CCD or three CCD may be employed.

Further, in the embodiment, the linear function is employed as the function of the maximum saturation value to be recorded in the function recording ROM 803. However, not being limited to the structure as described above, an arbitrary function such as the polynomial function, the power function, and the spline function may also be employed according to the required accuracy.

The hue plane to be defined by the function includes six hue planes of red (R), magenta (Ma), blue (B), cyan (Cy), green (G), and yellow (Ye). However, not being limited to the aforementioned hue plane, for example, three hue planes of red (R), blue (B), and green (G) are used for prioritizing the cost reduction. Alternatively, in addition to the aforementioned six hue planes, another six hue planes each as being intermediate between the respective hue planes, thus twelve hue planes in total may be provided for prioritizing the high-definition image.

The structure using the YCbCr color space is employed as the saturation correction section 707. However, not being limited to the aforementioned structure, for example, the structure using the CIE Lab color space may also be employed. The exemplary structure in the aforementioned case will be described hereinafter.

In this case, the Y/C separator 702 converts the RGB signal into the CIE Lab color space using the look-up table formed based on the known CMS (Color Management System) technique.

The Y-C separator 702 calculates the luminance signal V, the hue signal H, and the saturation signal C in the CIE Lab color space through the following equation 24 instead of the equation 17.

$$V = L$$
$$H = \tan^{-1}\left(\frac{b}{a}\right) \quad \text{[Equation 24]}$$
$$C = \sqrt{a^2 + b^2}$$

The luminance signal V is equivalent to the L in the CIE Lab color space as the equation 24 shows. The luminance signal will be referred to as L instead of V in the following description.

The function information with respect to the maximum saturation value maxC to be recorded in the function recording ROM 803 shown in FIG. 14 is also changed for the CIE Lab color space.

Referring to FIGS. 17A to 17G, the function information with respect to the maximum saturation value maxC in the CIE Lab color space to be recorded in the function recording ROM 803 will be described.

FIGS. 17A, 17B, 17C, 17D, 17E, 17F, and 17G show the saturation C and the luminance L on the red (R) hue plane in the CIE Lab color space, the saturation C and the luminance L on magenta (Ma) hue plane in the CIE Lab color space, the saturation C and the luminance L on the blue (B) hue plane in the CIE Lab color space, the saturation C and the luminance L on the cyan (Cy) hue plane in the CIE Lab color space, the saturation C and the luminance L on the green (G) hue plane in the CIE Lab color space, the saturation C and the luminance L on the yellow (Ye) hue plane in the CIE Lab color space, and the arrangement of the respective hue planes, respectively.

Referring to FIGS. 17A to 17F, the maximum saturation value maxC at a certain luminance L increases accompanied with the increase in the luminance L from 0, and takes the maximum value at the certain luminance $T_c$ (C=R, Ma, B, Cy, G and Ye) to be decreased to 0 at the maximum luminance L. Accordingly, the luminance $T_c$ (C=R, Ma, B, Cy, G, Ye) corresponding to the maximum saturation value on the respective hue plane is set as the threshold value. The luminance equal to or higher than the luminance $T_c$ is modeled using the high luminance function, and the luminance equal to or lower than the luminance $T_c$ is modeled using the low luminance function.

In the CIE Lab color space shown in FIGS. 17A to 17G, the cubic function as shown in the following equation 25 is employed as the function with respect to the maximum saturation value maxC.

$$\max C_c = \begin{cases} a_{hc}L^3 + b_{hc}L^2 + c_{hc}L + d_{hc} & (Y < T_c) \\ a_{lc}L^3 + b_{lc}L^2 + c_{lc}L + d_{lc} & (Y > T_c) \end{cases} \quad \text{[Equation 25]}$$

The function recording ROM 803 records the hue $H_c$, the luminance $T_c$, the parameters $a_{hc}$, $b_{hc}$, $c_{hc}$, $d_{hc}$ for the high luminance function, and the parameters $a_{lc}$, $b_{lc}$, $c_{lc}$, $d_{lc}$ for the low luminance function based on the function as expressed by the equation 25.

The subsequent process is substantially the same as the one performed in Embodiment 1. The conversion of the RGB signal from the CIE Lab color space will be performed through the known 3×3 matrix transformation.

The use of the CIE Lab color space provides the highly accurate luminance signal, hue signal and saturation signal, which makes sure to perform the high quality processing.

In the description, the hardware is used to perform the aforementioned process. However, not being limited to the one as described above, for example, the image signal from the color CCD 700 is recorded in the recording medium such as the memory card as the unprocessed Raw data, and the accompanying information such as the shooting condition (including the temperature of the image pickup device upon shooting, the exposure condition, and the image processing condition from the control section 116) is also stored in the recording medium as the header information. Then the image processing program as the software is performed by the computer such that the information in the recording medium is read by the computer for the processing. The transmission of various types of the information from the image pickup section to the computer may be performed not only via the recording medium but also via the communication line.

Referring to FIG. 18, the main routine of the image processing program will be described. The process steps substantially the same as those of Embodiment 1 as shown in FIG. 10 will be designated with the same codes.

Upon start of the routine, the image signal and the header information such as the temperature of the image pickup device, the exposure condition and the image processing condition are read (step S1).

The luminance signal, the hue signal, and the saturation signal are calculated through the equations 16 and 17, respectively (step S40).

The variable i indicating the number of the decomposition stage is initialized to 0 (step S2).

The number i of the decomposition stage is incremented by 1 (step S3).

The resolution decomposition at the ith decomposition stage is performed with respect to the luminance signal to obtain the high frequency component and the low frequency component (step S4).

As described in Embodiment 1 shown in FIG. 11, the gradation correction coefficient, the noise correction coefficient, and the edge correction coefficient to be used for various image processings are calculated (step S5).

The gradation correction coefficient is multiplied by the edge correction coefficient as expressed by the equation 13 to calculate the multiplier coefficient (step S6).

The upper limit value of the multiplier coefficient is set based on the ith decomposition stage, and the multiplier coefficient is corrected using the set upper limit value (step S7).

The coring process as expressed by the equation 12 is performed with respect to the high frequency component at the ith decomposition stage (step S8).

The multiplication process as expressed by the equation 14 is performed with respect to the high frequency component at the ith decomposition stage, which has been subjected to the coring process (step S9).

The multiplication processed high frequency component at the ith decomposition stage is outputted (step S10).

Thereafter, it is determined whether or not the number i of the decomposition stage is equal to or smaller than the specified number n (step S11). When it is equal to or smaller than the number n, the process returns to step S3 where the aforementioned process with respect to the next number of the decomposition stage is repeatedly performed.

When it is determined that the number i of the decomposition stage exceeds the specified value n, the low frequency component is outputted (step S12).

The multiresolution composition at the nth stage is performed using the corrected high frequency component and the low frequency component to generate the corrected luminance signal (step S13).

The saturation signal is corrected conforming to the corrected luminance signal to be described later referring to FIG. 19 (step S41).

The RGB signal is calculated through the equations 20 and 21 (step S42).

Then the known compression process and the like is performed (step S14), and the processed color image signal is outputted (step S15). The process then ends.

Next, referring to FIG. 19, the process for correcting the saturation in step S41 shown in FIG. 18 will be described.

Upon start of the routine, the luminance signal, the hue signal, the saturation signal, and the corrected luminance signal are read (step S50).

The parameters with respect to calculation of the maximum saturation value in the YCbCr color space as shown in FIGS. 15A to 15G are read (step S51).

Then the first maximum saturation value $\max C_{org}$ with respect to the luminance signal and the hue signal is calculated through the equation 23 (step S52).

The second maximum saturation value $\max C_{tra}$ with respect to the corrected luminance signal and the hue signal is calculated through the equation 23 (step S53).

The saturation correction coefficient $k_1$ is calculated as expressed by the equation 18 (step S54).

The coefficient for the saturation enhancement (corresponding to the gain $k_2$ for the saturation enhancement) described above is calculated (step S55).

The saturation signal is subjected to the correction process as expressed by the equation 19 (step S56). The corrected saturation signal is outputted (step S57). The process then returns to the routine shown in FIG. 18.

In Embodiment 2 as described above, various types of the space variant image processing of the color image signal may be performed, thus providing the high quality color image signal.

As the multiresolution decomposition is performed upon the image processing, the space variant process and the maintenance of the continuity among the local regions may be integrally performed while reducing the processing time. Particularly, in the embodiment, the use of the Gaussian filter and the Laplacian filter each with the simple filter structure allows the high speed processing as well as the cost reduction in the image processing system.

As the correction of the saturation signal and the saturation enhancement may be integrally performed to the luminance signal which has been subjected to the space variant various image processings, the cost may be reduced, and the color may be naturally reproduced without giving the viewer sense of discomfort.

The information with respect to the maximum saturation is used for performing the saturation enhancement process, thus providing the high quality image signal without departing from the color reproduction range.

The use of the YCbCr color space makes it possible to perform easy transformation, realize the high speed processing and reduce the cost. Meanwhile, the use of the CIE Lab color space makes it possible to provide the highly accurate luminance signal, hue signal and saturation signal, thus reliably providing the high quality processing.

The present invention is not limited to the one as described above, but various changes and modifications could be made without departing from the scope of the present invention.

The embodiments according to the present invention provide the following structures, functions and the effects.

The signal relevant to the image signal is subjected to the multiresolution decomposition, and the high frequency component is corrected to perform the multiresolution composition. This makes it possible to perform the various space variant image processings, thus providing the high quality image signal. The use of the multiresolution decomposition allows the space variant process to be performed integrally with the maintenance of the continuity among the local regions, thus reducing the processing time.

The monochrome image signal is multiresolution decomposed to correct the high frequency component, and then the multiresolution composition is performed. This allows the various space variant image processings, thus providing the high quality monochrome image signal. The use of the multiresolution decomposition allows the space variant processing to be performed integrally with the maintenance of the continuity among the local regions, thus reducing the processing time.

The color image signal is decomposed into the luminance signal, the hue signal, and the saturation signal. The luminance signal is multiresolution decomposed to correct the high frequency component. The multiresolution composition is then performed to correct the saturation signal based on the luminance signal, the corrected luminance signal, and the hue signal. The color image signal corrected based on the corrected luminance signal, the corrected saturation signal, and the hue signal is composed. This makes it possible to subject the color image signal to the various space variant image processings, thus providing the high quality color image signal. The use of the multiresolution decomposition allows the space variant process to be integrally performed with the maintenance of the continuity among the local regions, thus reducing the processing time. Moreover, as the saturation signal is corrected by following the luminance signal processing, the color may be naturally reproduced without giving the viewer sense of discomfort.

The multiresolution decomposition and the multiresolution composition are performed using the orthogonal wavelet transformation or the biorthogonal wavelet transformation. So various types of filters may be used for the wavelet transformation. The high frequency component may be derived for each direction, thus providing the high quality image signal with freedom in performing the various space variant processings to the greater degree.

The Gaussian filter and the Laplacian filter are used to perform the multiresolution decomposition and the multiresolution composition. As each of the Gaussian filter and the Laplacian filter has the simple filter structure, the processing may be performed at the higher speed and the cost for the image processing system may be reduced.

The correction coefficient for the gradation correction is calculated based on the visual system adaptation model. The gradation correction coefficient for the space variant process may be calculated based on the visual system adaptation model to allow the parameters to be automatically set and the process to be appropriately performed, thus providing the high quality image signal.

The shooting environmental condition is dynamically obtained, and the gradation correction coefficient of the high frequency component is obtained using the table based on the obtained information and the low frequency component. This makes it possible to perform the optimum gradation correction process which dynamically adapts to the condition which differs for each shooting. The use of the table for calculating the correction coefficient allows the high speed processing.

The gradation information feed section 302 feeds the standard value to the information which cannot be derived from the gradation information acquiring means. Even if the required information cannot be obtained, the correction coefficient may be calculated, thus realizing the stable gradation correction process.

The luminance level at the shooting is derived from the exposure condition such as the shutter speed, the aperture value, and the ISO sensitivity to set the constant term with respect to the visual system adaptation model. This allows the use of the highly accurate visual system adaptation model which dynamically adapts to the luminance level upon the shooting, thus ensuring the optimum gradation correction process.

The table used for calculating the gradation correction coefficient is structured based on the visual system adaptation model. As the gradation correction is performed based on the visual adaptation model, the resultant gradation correction becomes optimum.

The noise reducing correction coefficient is calculated based on the noise amount estimation model. The noise correction coefficient used for the space variant process is calculated based on the noise amount estimation model such that the parameters are automatically set and the optimum processing is enabled, thus providing the high quality image signal.

The various information relevant to the noise amount are dynamically obtained upon each shooting. Then the noise correction coefficient for the high frequency component is obtained using the table based on the obtained information and the low frequency component. This makes it possible to perform the optimum noise reducing process which dynamically adapts to the condition which differs for each shooting. The use of the table for calculating the correction coefficient allows the high speed processing.

The standard value is set for the information which cannot be derived from the noise information acquiring means. This makes it possible to calculate the correction coefficient even if the required information cannot be obtained, thus providing the stable noise reducing process.

The gain value with respect to the image signal is obtained based on the shutter speed, the aperture value, and the ISO sensitivity. The constant term with respect to the noise amount estimation model is set based on the thus obtained gain value and the temperature value. The highly accurate noise amount estimation model which dynamically adapts to the gain value and the temperature value upon shooting may be used to allow the optimum noise reducing process.

The correction coefficient for the gradation correction is calculated based on the visual system adaptation model. The noise reducing correction coefficient is calculated based on the noise amount estimation model. The noise correction coefficient for the high frequency component is obtained using the table based on the information dynamically derived from the various information relevant to the noise amount for each shooting and the low frequency component. The gain value with respect to the image signal is obtained based on the shutter speed, the aperture value, the ISO sensitivity, and the white balance coefficient. The constant term with respect to the noise amount estimation model is set based on the obtained gain value and the temperature value. The gradation correction coefficient used for the space variant process is calculated based on the visual system adaptation model and the noise correction coefficient is calculated based on the noise amount estimation model. This makes it possible to automatically set the parameters and perform the optimum processing, thus providing the high quality image signal. This also makes it possible to perform the optimum noise reducing process which dynamically adapts to the condition which differs for each shooting. The use of the table for calculating the correction coefficient allows the high speed processing. The highly accurate noise amount estimation model which dynamically adapts to the gain value and the temperature value upon the shooting may be used to realize the optimum noise reducing process. As the white balance coefficient is used in addition to the shutter speed, the aperture value, and the ISO sensitivity for setting the constant term relevant to the noise amount estimation model, the further optimum noise reducing process may be performed with respect to the color image signal.

The table for calculating the noise correction coefficient is structured based on the noise amount estimation model. The noise reducing process based on the noise amount estimation model may be performed optimally.

The correction coefficient for edge enhancement is calculated based on the edge enhancement model. The edge correction coefficient for the space variant processing is calculated based on the edge enhancement model to allow the parameters to be automatically set and the process to be performed optimally, thus providing the high quality image signal.

The edge enhancement amount upon shooting is dynamically obtained to calculate the edge correction coefficient for the high frequency component based on the obtained information and the number i of the decomposition stage using the table. This makes it possible to perform the optimum edge enhancement process which dynamically adapts to the condition which differs for each shooting. The use of the table for calculating the correction coefficient allows the high speed processing.

The standard value is set with respect to the information which cannot be derived from the edge information acquiring means. Even if the required information cannot be obtained, the correction coefficient may be calculated, thus realizing the stable edge enhancement process.

The edge enhancement amount set upon the shooting is obtained to set the constant term with respect to the edge enhancement model. The highly accurate edge enhancement model which dynamically adapts to the edge enhancement amount upon the shooting may be used, thus allowing the optimum edge enhancement process.

The table used for calculating the edge correction coefficient is structured based on the edge enhancement model. The edge enhancement process may be optimally performed based on the edge enhancement model.

The noise reducing correction coefficient is calculated based on the noise amount estimation model. In the case where at least one of the gradation correction coefficient, the noise correction coefficient, and the edge correction coefficient cannot be obtained, the standard value corresponding to the value which cannot be obtained is set. The high frequency component is subjected to the coring process based on the noise correction coefficient. The multiplier coefficient is calculated using the gradation correction coefficient and the edge correction coefficient. Then the high frequency component after being subjected to the coring process is multiplied by the calculated multiplier coefficient. The correction coefficient for the space variant process is calculated based on the model, which makes it possible to perform the automatic setting of the parameter and the optimum processing to provide the high quality image signal. Moreover, this allows various types of the space variant processing such as the gradation correction, the noise reduction, and the edge enhancement to be performed to the multiresolution decomposed high frequency component systematically, thus providing the high quality image signal. As the respective processings may be integrally performed, resulting in the high speed processing.

The upper limit value of the multiplier coefficient is obtained based on the number of the decomposition stage i to correct the multiplier coefficient. This makes it possible to improve continuity among the local regions, thus providing the high quality image signal.

The saturation correction coefficient relevant to the saturation signal is calculated based on the maximum saturation value with respect to the luminance signal and the hue signal, and the maximum saturation value with respect to the corrected luminance signal and the hue signal so as to correct the saturation signal. The saturation signal is corrected following the luminance signal processing to allow the color to be naturally reproduced without giving the viewer sense of discomfort, thus providing the high quality image signal.

The saturation enhancement process is performed by setting the enhancement coefficient relevant to the saturation signal. This makes it possible to perform the correction of the saturation signal conforming to the luminance signal subjected to various space variant images processing integrally with the saturation enhancement process. As a result, the image processing system may be structured at the low cost. As the information relevant to the maximum saturation may be used upon the saturation enhancement process, the saturation enhancement process may be performed without departing from the color reproduction region, thus providing the high quality image signal.

The color image signal is decomposed into the luminance signal, the hue signal, and the saturation signal in the YCbCr color space or the CIE Lab color space. The use of the YCbCr color space allows easy transformation, resulting in the high speed processing and cost reduction. On the other hand, the use of the CIE Lab color space provides the highly accurate luminance signal, the hue signal, and the saturation signal, thus realizing the process resulting in high quality.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image processing system which performs a predetermined image processing with respect to an image signal, the system comprising:
   a multiresolution decomposition section for decomposing the image signal to a high frequency component and a low frequency component at an nth stage, n being an integer equal to or larger than 1;
   a correction coefficient calculation section for calculating a correction coefficient with respect to the high frequency component;
   a correction section for correcting the high frequency component based on the correction coefficient; and
   a multiresolution composition section for composing a corrected image signal based on the corrected high frequency component and the low frequency component,
   wherein the correction coefficient calculation section includes a gradation correction coefficient calculation section for calculating a gradation correction coefficient with respect to the high frequency component at an ith decomposition stage, i being an integer equal to or larger than 1, and equal to or smaller than n, based on the low frequency component at the ith decomposition stage and on a visual system adaptation model,
   wherein the gradation correction coefficient calculation section calculates the gradation correction coefficient based on following equation:

$T_i(x,y) = L'_i(x,y)/L_i(x,y)$, where the low frequency component at the ith decomposition stage is set to $L_i(x,y)$ (x and y denote the coordinate position of the respective frequency components at the ith decomposition stage in the x and y directions) the gradation correction coefficient with respect to the high frequency component at the ith decomposition stage is set to $T_i(x,y)$ is obtained from $L_i(x,y)$ by the visual system adaptation model.

2. The image processing system according to claim 1, wherein the image signal is a monochrome image signal.

3. The image processing system according to claim 1, wherein the image signal is a color image signal, the image processing system further comprising:
   a Y/C separator section for separating the color image signal into a luminance signal, a hue signal and a saturation signal in a predetermined color space;
   saturation correction section for correcting the saturation signal based on the luminance signal, a corrected luminance signal from the multiresolution composition section, and the hue signal; and
   a Y/C composition section for composing a corrected color image signal based on the corrected luminance signal, the corrected saturation signal, and the hue signal.

4. The image processing system according to claim 3, wherein the correction coefficient calculation section further includes noise correction coefficient calculation section for calculating a noise correction coefficient with respect to the high frequency component at the ith decomposition stage based on the low frequency component at the ith decomposition stage and a noise amount estimation model, the noise correction coefficient calculation section including:
   a noise information acquiring section for acquiring information relevant to a temperature value upon the shooting operation and a gain value with respect to the color image signal; and
   a noise correction coefficient table section for outputting the noise correction coefficient with respect to the high frequency component at the ith decomposition stage based on the low frequency component at the ith decomposition stage and the information from the noise information acquiring section,
   the noise information acquiring section including:
   a gain calculation section for calculating the gain value with respect to the color image signal based on at least one of the information including a shutter speed, an aperture value, an ISO sensitivity, and a white balance coefficient upon the shooting operation; and
   a noise constant term calculation section for calculating a constant term relevant to the noise amount estimation model based on the gain value and the temperature value.

5. The image processing system according to claim 4, wherein the noise correction coefficient table section is structured based on the noise amount estimation model defined by the following equation:

$N_i(x,y) = \alpha_{gt} L_i(x,y)^2 + \beta_{gt} L_i(x,y) + \gamma_{gt}$ where the low frequency component at the ith decomposition stage is set to $L_i(x,y)$ (x and y denote the coordinate position of the respective frequency components at the ith decomposition stage in the x and y directions), the noise correction coefficient with respect to the high frequency component at the ith decomposition stage is set to $N_i(x,y)$, and constant terms defined based on the temperature value t and the gain value g upon the shooting operation are set to $\alpha_{gt}$, $\beta_{gt}$, and $\gamma_{gt}$.

6. The image processing system according to claim 3, wherein the saturation correction section further includes:
   a maximum saturation calculation section for calculating a maximum saturation value in the predetermined color space with respect to the luminance signal and the hue signal, and a maximum saturation value in the predetermined color space with respect to the corrected luminance signal and the hue signal;
   a saturation correction coefficient calculation section for calculating a saturation correction coefficient with respect to the saturation signal based on the maximum saturation value with respect to the luminance signal and the hue signal, and the maximum saturation value with respect to the corrected luminance signal and the hue signal, and
   the multiplication section for multiplying the saturation signal by the saturation correction coefficient.

7. The image processing system according to claim 3, wherein the saturation correction section includes saturation enhancement section for enhancing the saturation signal.

8. The image processing system according to claim 3, wherein the predetermined color space is a YCbCr color space or a CIE Lab color space.

9. The image processing system according to claim 1, wherein an orthogonal wavelet transformation or a biorthogonal wavelet transformation is used by the multiresolution decomposition section and the multiresolution composition section.

10. The image processing system according to claim 1, wherein a Gaussian filter and a Laplacian filter are used by the multiresolution decomposition section and the multiresolution composition section.

11. The image processing system according to claim 1, wherein the gradation correction coefficient calculation section includes:

a gradation information acquiring section for acquiring information relevant to an environmental condition upon a shooting operation; and a gradation correction coefficient table section for outputting the gradation correction coefficient with respect to the high frequency component at the ith decomposition stage based on the low frequency component at the ith decomposition stage and the information from the gradation information acquiring section.

12. The image processing system according to claim 11, wherein:

the gradation correction coefficient calculation section further includes gradation information feed section which feeds a standard value with respect to the information which is not acquired by the gradation information acquiring section, and the gradation correction coefficient table section outputs the gradation correction coefficient with respect to the high frequency component at the ith decomposition stage based on the low frequency component at the ith decomposition stage, and the information from the gradation information acquiring section or the gradation information feed section.

13. The image processing system according to claim 11, wherein the gradation information acquiring section includes:

a luminance level calculation section for calculating a luminance level upon the shooting operation based on the information with respect to an exposure condition which includes at least one of a shutter speed, an aperture value, and an ISO sensitivity upon the shooting operation; and a gradation constant term calculation section for calculating a constant term with respect to the visual system adaptation model based on the luminance level.

14. The image processing system according to claim 11, wherein the gradation correction coefficient table section is structured based on the visual system adaptation model defined by a following equation:

$$T_i(x,y) = \frac{D_{max}\left(\frac{L_i(x,y)}{D_{max}}\right)^{c1\left(c2+\sqrt{\frac{L_i(x,y)}{D_{max}}}\right)}}{L_i(x,y)}$$

where the low frequency component at the ith decomposition stage is set to $L_i(x,y)$ (x and y denote the coordinate position of the respective frequency components at the ith decomposition stage in the x and y directions), the gradation correction coefficient with respect to the high frequency component at the ith decomposition stage is set to $T_i(x,y)$, a maximum value of the gradation range of the image signal is set to $D_{max}$, and constant terms defined by the luminance level upon the shooting operation are set to c1 and c2.

15. The image processing system according to claim 1, wherein the correction coefficient calculation section further includes noise correction coefficient calculation section for calculating a noise correction coefficient with respect to the high frequency component at the ith decomposition stage based on the low frequency component at the ith decomposition stage and a noise amount estimation model.

16. The image processing system according to claim 15, wherein the noise correction coefficient calculation section includes:

a noise information acquiring section for acquiring information relevant to a temperature value upon the shooting operation and a gain value with respect to the image signal; and a noise correction coefficient table section for outputting the noise correction coefficient with respect to the high frequency component at the ith decomposition stage based on the low frequency component at the ith decomposition stage and the information from the noise information acquiring section.

17. The image processing system according to claim 16, wherein:

the noise correction coefficient calculation section further includes noise information feed section which feeds a standard value with respect to the information which is not acquired by the noise information acquiring section; and the noise correction coefficient table section outputs the noise correction coefficient with respect to the high frequency component at the ith decomposition stage based on the low frequency component at the ith decomposition stage, and the information from the noise information acquiring section or the noise information feed section.

18. The image processing system according to claim 16, wherein the noise information acquiring section includes:

a gain calculation section for calculating the gain value with respect to the image signal based on at least one of the information including a shutter speed, an aperture value, and an ISO sensitivity upon the shooting operation; and a noise constant term calculation section for calculating a constant term with respect to the noise amount estimation model based on the gain value and the temperature value.

19. The image processing system according to claim 16, wherein the noise correction coefficient table section is structured based on the noise amount estimation model defined by the following equation:

$$N_i(x,y) = \alpha_{gt} L_i(x,y)^2 + \beta_{gt} L_i(x,y) + \gamma_{gt}$$

where the low frequency component at the ith decomposition stage is set to $L_i(x,y)$ (x and y denote the coordinate position of the respective frequency components at the ith decomposition stage in the x and y directions), the noise correction coefficient with respect to the high frequency component at the ith decomposition stage is set to $N_i(x,y)$, and constant terms defined based on the temperature value t and the gain value g upon the shooting operation are set to $\alpha_{gt}$, $\beta_{gt}$, and $\gamma_{gt}$.

20. The image processing system according to claim 15, wherein the correction coefficient calculation section further includes edge correction coefficient calculation section for calculating an edge correction coefficient with respect to the high frequency component at the ith decomposition stage based on a number I of the decomposition stage and an edge enhancement model.

21. The image processing system according to claim 20, wherein the edge correction coefficient calculation section includes:

an edge information acquiring section for acquiring information relevant to an edge enhancement upon a shooting operation; and an edge correction coefficient table section for outputting the edge correction coefficient with respect to the high frequency component at the ith stage based on the number I of the decomposition stage and the information from the edge information acquiring section.

22. The image processing system according to claim 21, wherein:
the edge correction coefficient calculation section further includes edge information feed section for feeding a standard value with respect to the information which is not acquired by the edge information acquiring section; and
the edge correction coefficient table section outputs the edge correction coefficient with respect to the high frequency component at the ith stage based on the number I of the decomposition stage, and the information from the edge information acquiring section or the edge information feed section.

23. The image processing system according to claim 21, wherein the edge information acquiring section includes:
an edge enhancement amount calculation section for calculating an edge enhancement amount set upon the shooting operation; and
an edge constant term calculation section for calculating the constant term with respect to an edge enhancement model based on the edge enhancement amount.

24. The image processing system according to claim 21, wherein the edge correction coefficient table section is structured based on the edge enhancement model defined by the following equation:

$$E_i(x,y) = g(\delta i^2 + \epsilon i + \zeta)$$

where the edge correction coefficient with respect to the high frequency component at the ith decomposition stage is set to Ei(x,y) (x and y denote the coordinate position of the respective frequency components at the ith decomposition stage in the x and y directions), the constant term defined based on the edge enhancement amount set upon the shooting operation is set to g, and the predetermined constant terms are set to $\delta, \epsilon, \zeta$.

25. The image processing system according to claim 1, wherein the correction coefficient calculation section further includes edge correction coefficient calculation section for calculating an edge correction coefficient with respect to the high frequency component at the ith decomposition stage based on a number i of the decomposition stage and an edge enhancement model.

26. The image processing system according to claim 25, wherein the edge correction coefficient calculation section includes:
an edge information acquiring section for acquiring information relevant to an edge enhancement upon a shooting operation; and
an edge correction coefficient table section for outputting the edge correction coefficient with respect to the high frequency component at the ith stage based on the number i of the decomposition stage and the information from the edge information acquiring section.

27. The image processing system according to claim 26, wherein:
the edge correction coefficient calculation section further includes edge information feed section for feeding a standard value with respect to the information which is not acquired by the edge information acquiring section; and
the edge correction coefficient table section outputs the edge correction coefficient with respect to the high frequency component at the ith stage based on the number i of the decomposition stage, and the information from the edge information acquiring section or the edge information feed section.

28. The image processing system according to claim 26, wherein the edge information acquiring section includes:
an edge enhancement amount calculation section for calculating an edge enhancement amount set upon the shooting operation; and
an edge constant term calculation section for calculating the constant term with respect to an edge enhancement model based on the edge enhancement amount.

29. The image processing system according to claim 26, wherein the edge correction coefficient table section is structured based on the edge enhancement model defined by the following equation; $E_i(x,y) = g(\delta i^2 + \epsilon i + \zeta)$ where the edge correction coefficient with respect to the high frequency component at the ith decomposition stage is set to $E_i(x,y)$ (x and y denote the coordinate position of the respective frequency components at the ith decomposition stage in the x and y directions), the constant term defined based on the edge enhancement amount set upon the shooting operation is set to g, and the predetermined constant terms are set to $\delta, \epsilon, \zeta$.

30. The image processing system according to claim 15, wherein:
the correction coefficient calculation section further includes edge correction coefficient calculation section for calculating an edge correction coefficient with respect to the high frequency component at the ith decomposition stage based on the number i of the decomposition stage and the edge enhancement model, and
the correction section includes:
a standard value feed section for feeding a standard value with respect to at least one of the gradation correction coefficient, the noise correction coefficient, and the edge correction coefficient which is not acquired;
a coring section for performing a coring to the high frequency component at the ith decomposition stage based on the noise correction coefficient or the standard value with respect to the noise correction coefficient;
a multiplier coefficient calculation section for calculating a multiplier coefficient based on the gradation correction coefficient or the standard value with respect to the gradation correction coefficient, and the edge correction coefficient or the standard value with respect to the edge correction coefficient; and
a multiplication section for multiplying the high frequency component at the ith decomposition stage after the coring by the multiplier coefficient.

31. The image processing system according to claim 30, wherein the correction section further includes:
an upper limit value calculation section for calculating an upper limit value with respect to the multiplier coefficient based on the number i of the decomposition stage; and
a multiplier coefficient correction section for correcting the multiplier coefficient based on the upper limit value.

32. An image processing method which allows executing a predetermined image processing of an image signal, the method comprising:
a multiresolution decomposition step for decomposing the image signal to a high frequency component and a low frequency component at an nth stage, n being an integer equal to or larger than 1;
a correction coefficient calculation step for calculating a correction coefficient with respect to the high frequency component;

a correction step for correcting the high frequency component based on the correction coefficient; and a multiresolution composition step for composing an image signal corrected based on the corrected high frequency component and the low frequency component, wherein the correction coefficient calculation step includes a gradation correction coefficient calculation step for calculating a gradation correction coefficient with respect to the high frequency component at an ith decomposition stage, i being an integer equal to or larger than 1, and equal to or smaller than n, based on the low frequency component at the ith decomposition stage and a visual system adaptation model, wherein in the gradation correction coefficient calculation step the gradation correction coefficient is calculated based on following equation:

$$T_i(x,y)=L'_i(x,y)/L_i(x,y),$$

where the low frequency component at the ith decomposition stage is set to $Li(x.y)$, (x and y denote the coordinate position of the respective frequency components at the ith decomposition stage in the x and y directions), the gradation correction coefficient with respect to the high frequency component at the ith decomposition stage is set to $Ti(x,y)$, $L'_i(x,y)$ is obtained from $L_i(x,y)$ by the visual system adaptation model.

33. The image processing method according to claim 32, wherein the image signal is a color image signal, the method further comprising:

a Y/C separating step for separating the color image signal into a luminance signal, a hue signal and a saturation signal in a predetermined color space;

a saturation correction step for correcting the saturation signal based on the luminance signal, a corrected luminance signal from the multiresolution composition step, and the hue signal; and a Y/C composition step for composing a corrected color image signal based on the corrected luminance signal, the corrected saturation signal, and the hue signal.

34. The image processing method according to claim 32, wherein the correction coefficient calculation step further includes a noise correction coefficient calculation step for calculating a noise correction coefficient with respect to the high frequency component at the ith decomposition stage based on the low frequency component at the ith decomposition stage and a noise amount estimation model.

35. The image processing method according to claim 34 wherein the correction coefficient calculation step further includes an edge correction coefficient calculation step for calculating an edge correction coefficient with respect to the high frequency component at the ith decomposition stage based on the number i of the decomposition stage and an edge enhancement model.

36. A non-transitory recording medium on which a program is recorded, the program being readable by a computer so as to execute a predetermined image processing of an image signal, the program comprising:

a multiresolution decomposition module for decomposing the image signal to a high frequency component and a low frequency component at an nth stage, n being an integer equal to or larger than 1;

a correction coefficient calculation module for calculating a correction coefficient with respect to the high frequency component;

a correction module for correcting the high frequency component based on the correction coefficient; and a multiresolution composition module for composing a corrected image signal based on the corrected high frequency component and the low frequency component, wherein the correction coefficient calculation module includes a gradation correction coefficient calculation module for calculating a gradation correction coefficient with respect to the high frequency component at an ith decomposition stage, i being an integer equal to or larger than 1, and equal to or smaller than n, based on the low frequency component at the ith decomposition stage and on a visual system adaptation model, wherein the gradation correction coefficient calculation module calculates the gradation correction coefficient based on following equation:

$$T_i(x,y)=L'_i(x,y)/L_i(x,y),$$

where the low frequency component at the ith decomposition stage is set to $Li(x,y)$ (x and y denote the coordinate position of the respective frequency components at the ith decomposition stage in the x and y directions), the gradation correction coefficient with respect to the high frequency component at the ith decomposition stage is set to $Ti(x,y)$, $L'_i(x,y)$ is obtained from $L_i(x,y)$ by the visual system adaptation model.

* * * * *